United States Patent
Gu et al.

(10) Patent No.: US 8,676,373 B2
(45) Date of Patent: Mar. 18, 2014

(54) GLOBAL OFFSET COMPENSATION FOR A CNC MACHINE

(75) Inventors: Jie Gu, Clarkston, MI (US); Sheri K. Kurgin, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 370 days.

(21) Appl. No.: 13/032,865

(22) Filed: Feb. 23, 2011

(65) Prior Publication Data

US 2012/0213604 A1 Aug. 23, 2012

(51) Int. Cl.
*G06F 19/00* (2011.01)

(52) U.S. Cl.
USPC .............................. 700/193; 409/131; 82/118

(58) Field of Classification Search
USPC ............................... 700/193; 409/131; 82/118
See application file for complete search history.

(56) References Cited

U.S. PATENT DOCUMENTS

| | | | | |
|---|---|---|---|---|
| 4,370,721 A | * | 1/1983 | Berenberg et al. | 700/195 |
| 5,091,861 A | * | 2/1992 | Geller et al. | 700/192 |
| 8,024,068 B2 | * | 9/2011 | Gray | 700/252 |
| 8,313,271 B2 | * | 11/2012 | Smith | 409/131 |
| 2002/0078802 A1 | * | 6/2002 | Cardemon et al. | 82/1.11 |
| 2004/0028487 A1 | * | 2/2004 | Cardemon et al. | 408/1 R |
| 2005/0013926 A1 | * | 1/2005 | Rutkowski et al. | 427/8 |
| 2005/0166726 A1 | * | 8/2005 | Montesanti et al. | 82/1.11 |
| 2005/0268759 A1 | * | 12/2005 | Cardemon et al. | 82/1.11 |
| 2006/0029476 A1 | * | 2/2006 | Cardemon et al. | 408/1 R |
| 2008/0058982 A1 | * | 3/2008 | Gray | 700/159 |

* cited by examiner

*Primary Examiner* — Mohammad Ali
*Assistant Examiner* — Anthony Whittington
(74) *Attorney, Agent, or Firm* — Quinn Law Group, PLLC

(57) ABSTRACT

A method for offsetting a part on a CNC machine comprises clamping a part to a fixture on a table for the CNC machine and machining a plurality of features and surfaces on the part. A plurality of global offsets are calculated for the fixture and the table based on location data of the plurality of features and surfaces. An actual part position on a global coordinate system for the CNC machine is determined by translating the fixture and the table by each the plurality of global offsets to the coordinate system. The actual part position is compensated to a nominal part position for each of the controllable axes of the CNC machine and a controller is programmed with a global offset compensation based upon the calculated offset for each controllable axis of the CNC machine to adjust each of the controllable axes to the actual part position.

12 Claims, 8 Drawing Sheets

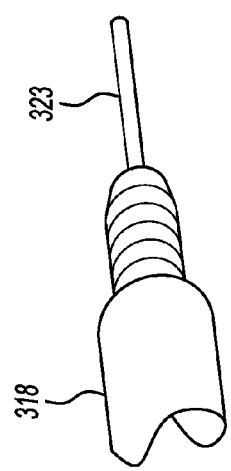
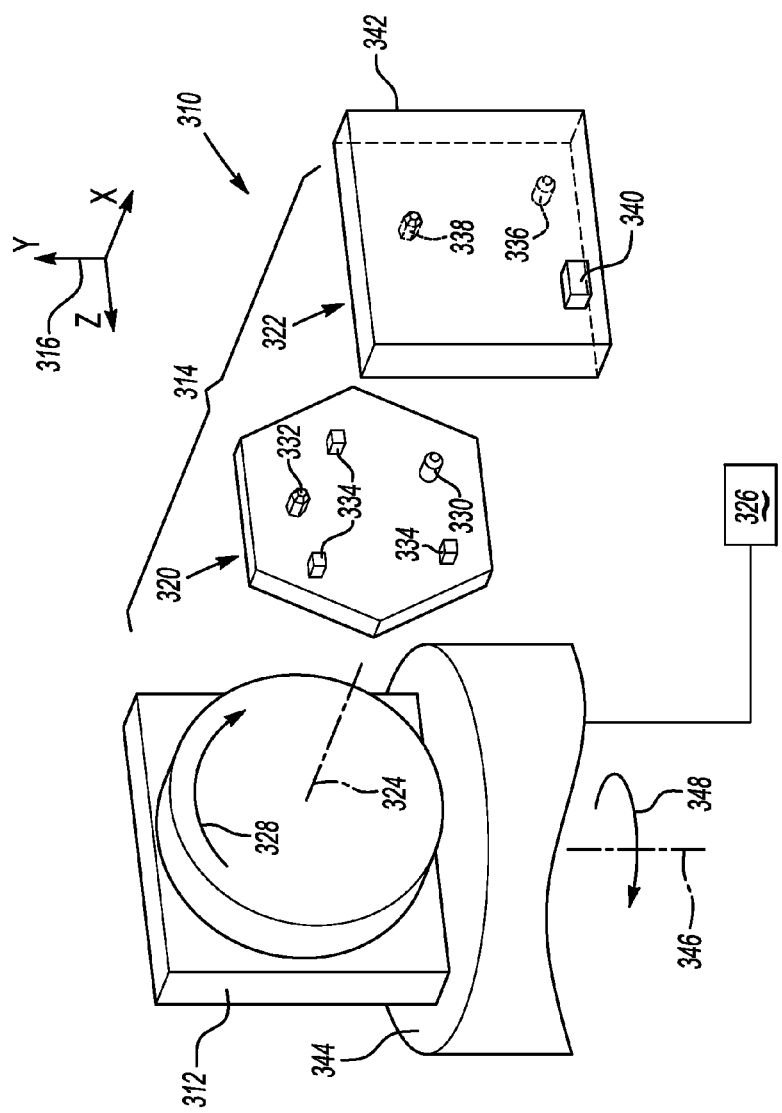
Fig-4

GLOBAL OFFSET COMPENSATION FOR A CNC MACHINE

TECHNICAL FIELD

The present invention relates generally to properly offsetting parts for machining on a CNC machine.

BACKGROUND

Computed numerically controlled (CNC) machines are frequently used to manufacture items that require machining processes to be used. In order to maximize CNC machining productivity, fixtures may be employed to hold the part in place during machining The fixtures are aligned with the machine table. A fixture allows parts with different locating and clamping arrangements to be machined on a common machine table. When the part is clamped on the fixture during machining, it is possible that it is distorted by clamping pressure and/or tool pressure and endure also will not be perfectly aligned with the fixture, due to debris or other locating errors. Additionally, the tables have linear and rotational position errors. A complex maintenance procedure for correcting the table error is currently used. This time consuming method requires the effort of skilled maintenance personnel to indicate the tables and adjust the parameters. However, residual errors remain even after the maintenance procedure is performed and over time the table positions may drift, increasing table position errors. The fixture may also have alignment errors. Several offset methods are currently available to compensate the fixture error electronically. However, both table errors and fixture errors affect the part quality.

SUMMARY

A method for locating a part on a CNC machine comprises clamping a part to a fixture on a table for the CNC machine and machining a plurality of features and surfaces on the part. A plurality of global offsets are calculated for the fixture and the table based on location data of the plurality of features and surfaces. An actual part position on a global coordinate system for the CNC machine is determined by translating the fixture and the table by the plurality of global offsets to the coordinate system. The actual part position is compensated to a nominal part position for each of the controllable axes of the CNC machine and a controller is programmed with a global offset compensation based upon the calculated offset for each controllable axis of the CNC machine to adjust each of the controllable axes to the actual part position.

A method for loading a part on a four-axis CNC machine having six degrees of freedom comprises mounting a fixture on a table for the CNC machine and clamping a part to the fixture. A plurality of features and surfaces are machined on the part and an actual part center position is determined using the machined features and surfaces. A table offset, a fixture offset, and a rotary axis offset of the actual part center position to a nominal part center position are calculated. The table and the fixture are translated by the table offset, the fixture offset, and the rotary axis offset. A controller is programmed with a global offset compensation based upon the calculated offset amount for each of the six degrees of freedom to translate the coordinate system on each of the four axes to the actual part center position.

A method for loading a part on a five-axis CNC machine having nine degree of freedom comprises mounting a fixture on a table for the CNC machine and clamping a part to the fixture. A plurality of features and surfaces are machined on the part and an actual part center position is determined using the machined features and surfaces. A first table offset, a second table offset, a fixture offset, a first rotary axis offset, and a second rotary axis offset of the actual part center position to a nominal part center position are calculated. The tables and the fixture are translated by the first table offset, the second table offset, the fixture offset, the first rotary axis offset, and the second rotary axis offset. A controller is programmed with a global offset compensation based upon the calculated offset amount for each of the nine degrees of freedom to translate the coordinate system on each of the five axes to the actual part center position.

The above features and advantages, and other features and advantages of the present invention will be readily apparent from the following detailed description of the preferred embodiments and best modes for carrying out the present invention when taken in connection with the accompanying drawings and appended claims.

BRIEF DESCRIPTION OF THE DRAWINGS

FIG. 4 is a partial schematic exploded view of a portion of a fourth CNC machine having a spindle, a fixture and a part located on a table for the fourth CNC machine;

DETAILED DESCRIPTION

Figure 1:
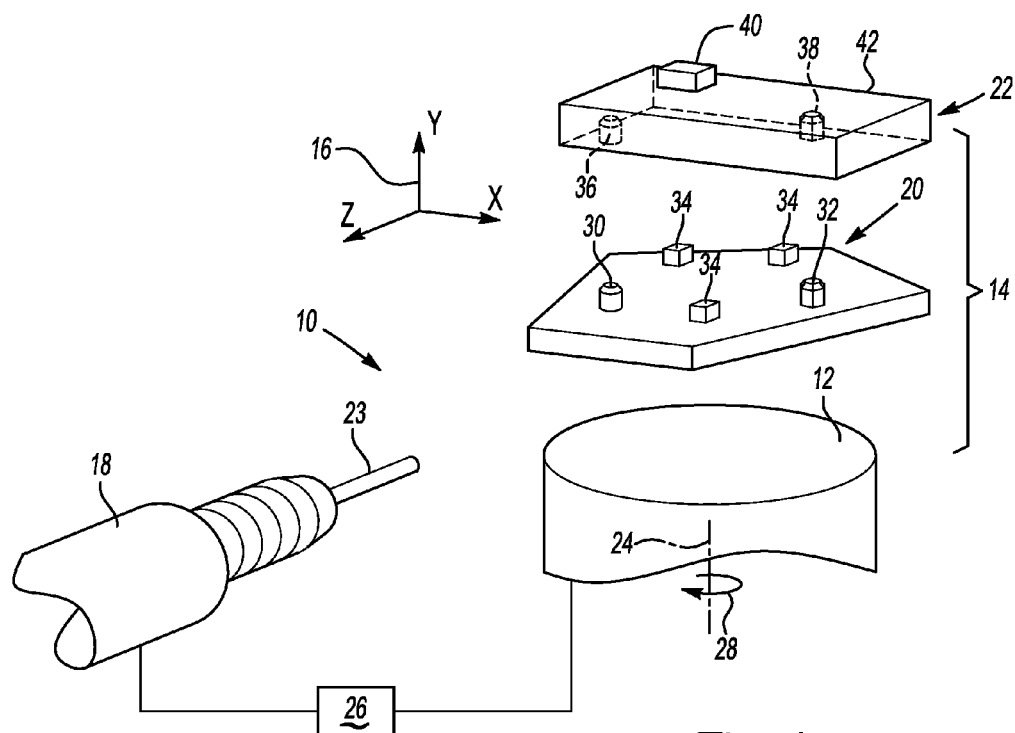
FIG. 1 is a partial schematic exploded view of a portion of a first CNC machine having a spindle, a fixture and a part located on a table for the first CNC machine.

Referring to the drawings, wherein like reference numbers refer to the same or similar components throughout the several views, FIG. 1 illustrates a partial view of a portion of a four-axis B rotary table CNC machine 10. The CNC machine 10 has a table 12. A fixture 20 and a part 22 may be assembled on the table 12, as illustrated at 14. A coordinate system 16 is associated with the table 12. A spindle 18 is operatively connected to the CNC machine 10 and can be moved by the coordinate system 16 for the CNC machine 10. The spindle 18 is oriented along the negative Z-axis of the coordinate system 16. A cutting tool 23 is clamped on the spindle 18 for machining the part 22. The spindle 18 may be rotated such that the cutting edge of tool 23 can remove material from part 22. The machined part 22 is measured by a coordinate measuring machine (CMM) machine or a gage for dimensional data.

The spindle 18 and the table 12 are operatively connected to a controller 26 for the CNC machine 10 to provide input from the spindle 18 and the table 12. The controller 26 also controls the CNC machine 10 including the rotational position of the table 12. In the embodiment shown, the table 12 of the CNC machine 10 rotates about the B-axis (shown at 24). The rotation of the CNC machine 10 is represented by arrow 28.

A fixture 20 is mounted to the table 12 and a part 22 is mounted on the fixture 20. The fixture 20 accommodates for different parts 22 to be mounted to the table 12. The fixture 20 is used to accommodate a variety of support locations on the parts 22 such that different parts 22 may be mounted to a common table 12. The table 12 and the fixture 20 can be compensated to the CNC machine 10. The table 12 for the CNC machine 10 is configured to receive a fixture 20. One part 22 is clamped on the fixture 20 and the fixture 20 is mounted to the machine table 12. The fixture 20 includes a plurality of locators that are used to support the part 22 on the fixture 20. In the embodiment shown, there is at least one primary locator 30, a secondary locator 32 and three tertiary locators 34. The part 22 defines locator holes 36, 38 that correspond to some of the plurality of locators 30-34. However, the fixture 20 is designed to receive multiple different parts 22. Therefore, the part 22 may only define locator holes 36, 38 corresponding to some of the plurality of locators 30-34 on the fixture 20. The primary locator 30 typically has a corresponding primary locator hole 36 and the secondary locator 32 typically has a secondary locator hole 38. Additional locator holes are not shown, but may correspond to any or all of the tertiary locators 34.

The actual part 22 position may not be located properly with respect to the fixture and table for a number of reasons including debris, distortion of the locators resulting from fixture wear, wear on the part locator holes resulting from repeated locating, distortion of the part 22 due to clamping pressure and cutting force, and drifting of the table 12 and/or the fixture 20 that has occurred since the table 12 and the fixture 20 were compensated to align with the CNC machine 10. The actual part 22 position compared to the nominal part position, may include any linear deviations and rotational deviations resulting from the part 22 and/or fixture 20 being tilted relative to any of the planes of the coordinate system 16. Any misalignment of the part 22 may cause the part 22 to be shifted or skewed relative to the CNC machine 10. Thus, the misalignment would result in the CNC machine 10 machining at the wrong locations on the part 22. Therefore, the coordinate system 16 and the B-axis 24 must be compensated to the part 22 before the CNC machine 10 can machine the part 22. The coordinate system 16 center is compensated by adjusting the actual part 22 center and table orientation electronically with respect to the CNC machine 10.

To define the coordinate system 16 and the B-axis 24 nominal position information is input in the controller 26 including a nominal table center ($Tx_B$, $Ty_B$, $Tz_B$), a nominal part center ($Px_0$, $Py_0$, $Pz_0$), and a nominal table rotation (B). A CMM (not shown) measures the deviations of the features of the actual part 22 machined in the CNC machine 10, and the deviations are converted to offset values through the use of software. The CNC machine 10 utilizes the nominal and offset information to compensate the coordinate system 16 and the B-axis 24 to the actual part center.

Once the part 22 is clamped on the fixture 20 the spindle 18 machines multiple features 40 (only one shown) and surfaces 42 on the part 22. The features 40 and surfaces 42 are measured by the CMM machine to determine the actual position of the part 22. Each of the features 40 and the surfaces 42 are machined at multiple rotational positions of the CNC machine 10 about the B-axis 24.

The coordinate system travels with the part center as the table 12 rotates. For a four-axis B rotary table CNC machine 10 the table 12 rotary axis B aligns with the Y-axis of the coordinate system 16 when B is at zero degree. Therefore, there is a B rotational offset and linear offsets for X-axis and Z-axis for table 12, but there is only linear offset for Y-axis.

For a four-axis B rotary table CNC machine 10 there are six degrees of freedom of error by which the actual part 22 center may be offset from the nominal part 22 center. The table errors may be compensated in the X-direction by the table offset ($\Delta Tx_B$), and in the Z-direction by the table offset ($\Delta Tz_B$). The fixture errors may be compensated in the X-direction by the fixture offset ($\Delta Px_0$), in the Y-direction by the fixture offset ($\Delta Py_0$), and in the Z-direction by the fixture offset ($\Delta Pz_0$). The table rotational error may be compensated in B-direction by the rotational offset ($\Delta B$) about the B-axis 24. Please note, all subscripts refer to the rotational orientation about the B-axis 24 at which each particular value refers to. Thus, a subscript 0 refers to the fixture offsets at the zero-degrees B position and a subscript B refers to the table offsets for a four-axis B machine.

Although there are six degrees of freedom of error for the part 22, for a four-axis machine there are only four controllable axes on which the coordinate system 16 may be adjusted to compensate for the six degrees of freedom of error. Using the nominal table center ($Tx_B$, $Ty_B$, $Tz_B$), the nominal part center ($Px_0$, $Py_0$, $Pz_0$), the nominal table rotation (B) and the corresponding offsets the coordinate system 16 origin is converted to position information for each of the four-axes. This is represented by the set of equations below which provide a global offset compensation for the CNC machine 10, where Wx is the X-axis position, Wy is the Y-axis position, Wz is the Z-axis position and Wb is the B-axis position from machine absolute zero:

$$Wx = (Tx_B + \Delta Tx_B) + (Px_0 + \Delta Px_0)\cos B - (Pz_0 + \Delta Pz_0)\sin B;$$

$$Wy = Ty_B + Py_0 + \Delta Py_0;$$

$$Wz = (Tz_B + \Delta Tz_B) + (Px_0 + \Delta Px_0)\sin B + (Pz_0 + \Delta Pz_0)\cos B;$$
and $$Wb = B + \Delta B.$$

The controller 26 translates the table 12 and the fixture 20 by the offset amount for each of the four-axes to adjust coordinate system 16 and the B-axis 24 and therefore compensate for the deviations. Once the six offset amounts have been converted by the controller 26 then the coordinate system 16 and the B-axis 24 are compensated by the global offset, which compensates for all of the four controllable axes of the CNC machine 10. The part 22 may be machined by the CNC machine 10 once the global offset compensation has been applied. After the part 22 has been machined by the CNC machine 10 it may be measured by a coordinate measuring machine (CMM) to check the accuracy.

Therefore, the fixture 20 is aligned to the table 12 and the table 12 is installed on the CNC machine 10. The fixture 20 has alignment errors and the table 12 has installation errors. Both types of error have detrimental effects on part quality. The table 12 may have linear and rotational errors, and the fixture 20 has linear errors. The total number of table and fixture errors is the degrees of freedom of the CNC machine 10. The CNC machine 10 has several controllable axes; however, the number of degrees of freedom is larger than the number of controllable axes. The global offset translates the errors for each direction of the degree of freedom into adjustments that can be made on the controllable axes of the coordinate system 16 in order to electronically compensate both table 12 and fixture 20 errors. All the features machined 40 and 42 of the part 22 in various table 12 positions in the operation are machined with the global coordinate system 16, which is compensated by the global offset. Therefore the global offset electronically compensates all the features by the controllable axes. In addition to fixture 20 alignment and table 12 position errors, other factors such as clamping and cutting forces may distort the part 22. The part 22 may not be clamped in the proper position on the fixture 20, which will also affect part 22 quality. The global offset optimizes the above errors as well as other unknown errors as long as the errors are consistent from part 22 to part 22.

The fixture 20 has three possible linear position alignment errors. The table 12 has two possible linear installation errors and one possible rotational installation error. Both types of error affect the part 22 quality. The total number of the adjustable degrees of freedom of a four-axis machine 12 is six. The four-axis machine 12 has four controllable axes. The global offset translates the errors in six degree of freedom directions into four controllable axes directions in order to electronically compensate both table 12 and fixture 20 errors. All the features 40, 42 machined in various table 12 positions in the operation are machined in the global coordinate system 16, which is compensated by the global offset. Therefore the six global offsets electronically compensate all the features by the four controllable axes. The global offset also optimizes the distortion errors, part clamping location errors, as well as other unknown errors as long as the errors are consistent.

Figure 2:
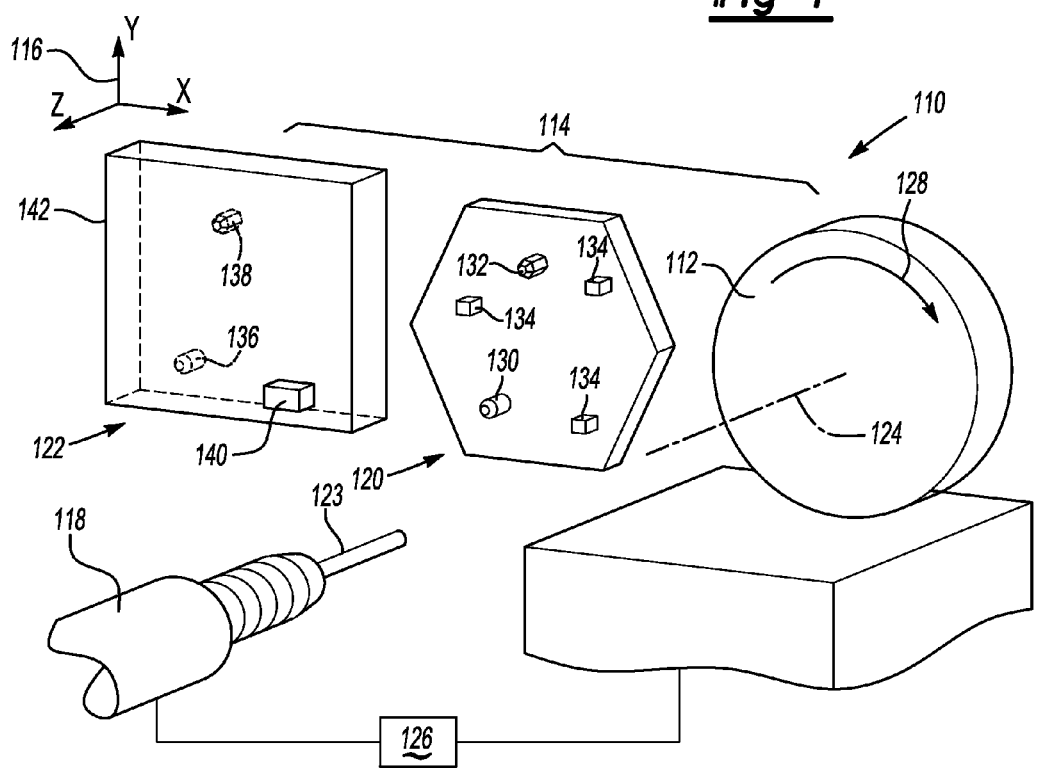
FIG. 2 is a partial schematic exploded view of a portion of a second CNC machine having a spindle, a fixture and a part located on a table for the second CNC machine.

FIG. 2 illustrates a partial view of a portion of a second embodiment of a CNC machine 110. In particular, the CNC machine is a four-axis C rotary table CNC machine 110. The CNC machine 110 has a table 112. The embodiment in FIG. 2 differs from the embodiment of FIG. 1 in that the CNC machine is a C rotary table rather than a B rotary table and the global offset compensation for the table will accordingly be different as explained below.

A fixture 120 and a part 122 may be assembled on the table 112, as illustrated at 114. A coordinate system 116 is associated with the table 112. A spindle 118 is operatively connected to the CNC machine 110 and can be adjusted by the coordinate system 116 for the CNC machine 110. The spindle 118 is oriented along the Z-axis of the coordinate system 116. A cutting tool 123 is clamped on the spindle 118 for machining the part 122.

The spindle 118 and the table 112 are operatively connected to a controller 126 to provide input from the spindle 118 and the table 112. The controller 126 also controls the CNC machine 110 including the rotational position of the table 112. In the embodiment shown, the table 112 of the CNC machine 110 rotates about the C-axis (shown at 124). The rotation of the CNC machine 110 is represented by arrow 128.

A fixture 120 is mounted to the table 112 and a part 122 is mounted on the fixture 120. The fixture 120 accommodates for different parts 122 to be mounted to the table 112. The fixture 120 is used to accommodate a variety of support locations on the parts 122 such that different parts 122 may be mounted to a common table 112. The table 112 and the fixture 120 have previously been aligned with the CNC machine 110. The table 112 for the CNC machine 110 is configured to receive a fixture 120. One part 122 is clamped on the fixture 120 and mounted to the CNC machine 110. The fixture 120 includes a plurality of locators that are used to support the part 122 on the fixture 120. In the embodiment shown, there is at least one primary locator 130, a secondary locator 132 and three tertiary locators 134. The parts 122 define locator holes 136, 138 that correspond to some of the plurality of locators 130-134. However, each fixture 120 is designed to receive multiple different parts 122. Therefore, the part 122 may only define locator holes 136, 138 corresponding to some of the plurality of locators 130-134 on the fixture 120. The primary locator 130 typically has a corresponding primary locator hole 136 and the secondary locator 132 typically has a secondary locator hole 138. Additional locator holes are not shown, but may correspond to any or all of the tertiary locators 134.

The actual part 122 position may not be located properly with respect to the nominal position for a number of reasons including debris, distortion of the locators resulting from fixture wear, wear on the part locator holes resulting from repeated locating, distortion of the part 122 due to clamping pressure and cutting force, and drifting of the table 112 and/or the fixture 120 that has occurred since the table 112 and the fixture 120 were compensated to the CNC machine 110. The actual part 122 position compared to the nominal part position, may include any linear deviations and rotational deviations resulting from the part 122 and/or fixture 120 being tilted relative to any of the planes of the coordinate system 116. Any misalignment of the part 122 may causes the parts 122 to be shifted or skewed relative to the CNC machine 110. Thus, the misalignment would result in the CNC machine 110 machining at the wrong locations on that part 122. Therefore, the coordinate system 116 and the C-axis 124 must be compensated to the part 122 before the CNC machine 110 can machine the part 122. The coordinate system 116 center is compensated by adjusting the coordinate system 116 and table to the actual part center to align the part 122 with respect to the CNC machine 110.

To define the coordinate system 116 and the C-axis 124 nominal position information is input in the controller 126 including a nominal table center ($Tx_C$, $Ty_C$, $Tz_C$), a nominal part center ($Px_0$, $Py_0$, $Pz_0$), and a nominal table rotation (C). A CMM (not shown) measures the deviation of the features of actual part machined on the CNC machine 110, and the deviations are converted to offset values. The CNC machine 110 utilizes the nominal and offset information to compensate the coordinate system 116 and the C-axis 124 with the actual part center.

Once the part 122 is clamped on the fixture 120 the cutting tool 123 machines multiple features 140 (only one shown) and surfaces 142 on the part 122. The features 140 and surfaces 142 are measured by the CMM machine to determine the actual position of the part 122. Each of the features 140 and the surfaces 142 are machined at multiple rotational positions of the CNC machine 110 about the C-axis 124.

The coordinate system 116 travels with the part 122 center as the table 112 rotates. For a four-axis C rotary table CNC machine 10 the table 12 rotary axis C aligns with the Z-axis of the coordinate system 116 when C is at zero degrees. Therefore, there is a C rotational offset for the X-axis and Y-axis, but there is only linear offset for the Z-axis.

For a four-axis C rotary table CNC machine 110 there are six degrees of freedom of error by which the actual part 122 may be offset from the nominal part 122 center. The table errors may be compensated in the X-direction by table offset ($\Delta Tx_C$), and in the Y-direction by the table offset ($\Delta Ty_C$). The fixture error may be compensated in the X-direction by the fixture offset ($\Delta Px_0$), in the Y-direction by the fixture offset ($\Delta Py_{-0}$), and in the Z-direction by the fixture offset ($\Delta Pz_0$).

The table rotational error may be compensated by the rotational offset ($\Delta C$) about the C-axis 124. Please note, all subscripts refer to the rotational orientation about the C-axis 124 at which each particular value refers to. Thus, a subscript 0 refers to the fixture offset at zero-degrees C. position and a subscript C refers to the table offsets for a four-axis C machine 110.

Although there are six degrees of freedom of error for the part 122, for a four-axis machine there are only four controllable axes on which the coordinate system 116 may be adjusted to compensate for the six degrees of freedom of error. Using the nominal table center ($Tx_C$, $Ty_C$, $Tz_C$), the nominal part center ($Px_0$, $Py_0$, $Pz_0$), the nominal table rotation (C) and the corresponding offsets, the coordinate system 116 is converted to values for each of the four-axes. This is represented by the set of equations below which provide a global offset compensation for the CNC machine 110, where Wx is the X-axis position, Wy is the Y-axis position, Wz is the Z-axis position and Wc is the C-axis 128 position from machine absolute zero:

$Wx=(Tx_C+\Delta Tx_C)+(Px_0+\Delta Px_0)\cos C+(Py_0+\Delta Py_0)\sin C;$ $Wy=(Ty_C+\Delta Ty_C)-(Px_0+\Delta Px_0)\sin C+(Py_0+\Delta Py_0)\cos C;$ $Wz=Tz_C+Pz_0+\Delta Pz_0;$ and $Wc=C+\Delta C.$ The controller 126 translates the table 112 and the fixture 120 by the offset amount for each of the four-axes to adjust the coordinate system 116 and the C-axis 128 and therefore compensate for the deviations. Once the six offset amounts have been translated by the controller 126 then the coordinate system 116 and the C-axis 128 are compensated by the global offset, which compensates for all of the four controllable axes of the CNC machine 110. The part 122 may be machined by the CNC machine 110 once the global offset compensation has been applied. After the part 122 has been machined by the CNC machine 110 it may be measured by the CMM to check the accuracy.

Figure 3:
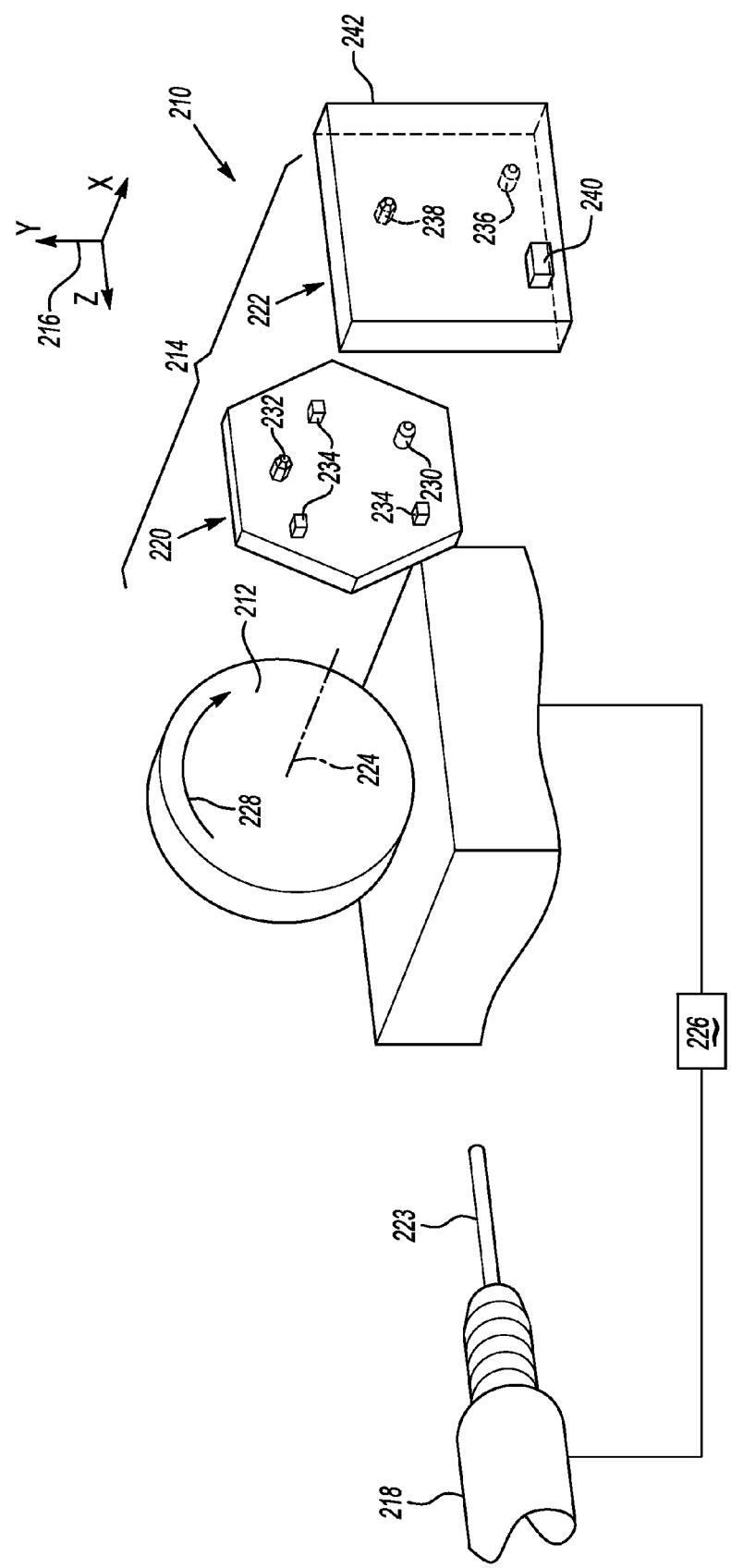
FIG. 3 is a partial schematic exploded view of a portion of a third CNC machine having a spindle, a fixture and a part located on a table for the third CNC machine.

FIG. 3 illustrates a partial view of a portion of a third embodiment of a CNC machine 210. The CNC machine 210 is a four-axis A rotary table CNC machine 210. The CNC machine 210 has a table 212. The embodiment in FIG. 3 differs from the embodiments above in that the CNC machine is an A rotary table rather than a B or a C rotary table and the global offset compensation for the table will accordingly be different as explained below.

A fixture 220 and a part 222 may be assembled on the table 212, as illustrated at 214. A coordinate system 216 is associated with the table 212. A spindle 218 is operatively connected to the CNC machine 210 and can be adjusted by the coordinated system 216 for the CNC machine 210. The spindle 218 is oriented along the Z-axis of the coordinate system 216. A cutting tool 223 is clamped on the spindle 218 for machining the part 222. The cutting edge of the cutting tool 223 can remove material from the part 222. The machine part 222 is measured by a CMM machine (not shown) or a gauge for dimensional data.

The spindle 218 and the table 212 are operatively connected to a controller 226 to provide input from the spindle 218 and the table 212. The controller 226 also controls the CNC machine 210 including the rotational position of the table 212. In the embodiment shown, the table 212 of the CNC machine 210 rotates about the A-axis (shown at 224). The rotation of the CNC machine 210 is represented by arrow 228.

A fixture 220 is mounted to the table 212 and a part 222 is mounted on the fixture 220. The fixture 220 accommodates for different parts 222 to be mounted to the table 212. The fixture 220 is used to accommodate a variety of support locations on the parts 222 such that different parts 222 may be mounted to a common table 212. The table 212 and the fixture 220 can be compensated to the CNC machine 210. The table 212 for the CNC machine 210 is configured to receive a fixture 220. One part 222 is clamped on the fixture 220 and mounted to the machine table 212. The fixture 220 includes a plurality of locators that are used to support the part 222 on the fixture 220. In the embodiment shown, there is at least one primary locator 230, a secondary locator 232 and three tertiary locators 234. The part 222 each define locator holes 236, 238 that correspond to some of the plurality of locators 230-234. However, each fixture 220 is designed to receive multiple different parts 222. Therefore, the part 222 may only define locator holes 236, 238 corresponding to some of the plurality of locators 230-234 on the fixture 220. The primary locator 230 typically has a corresponding primary locator hole 236 and the secondary locator 232 typically has a secondary locator hole 238. Additional locator holes are not shown, but may correspond to any or all of the tertiary locators 234.

The actual part 222 position may not be located properly with respect to the fixture and table for a number of reasons including debris, distortion of the locators resulting from fixture wear, wear on the part locator holes resulting from repeated locating, distortion of the part 222 due to clamping pressure and cutting force, and drifting of the table 212 and/or the fixture 220 that has occurred since the table 212 and the fixture 220 were compensated to the CNC machine 210. The actual part 222 position compared to the nominal part position, may include any linear deviations and rotational deviations resulting from the part 222 and/or fixture 220 being tilted relative to any of the planes of the coordinate system 216. Any misalignment of the part 222 may cause the parts 222 to be shifted or skewed relative to the CNC machine 210. Thus, the misalignment would result in the CNC machine 210 machining at the wrong locations on that part 222. Therefore, the part 222 must be located properly with respect to the coordinate system 216 and the A-axis 224 before the CNC machine 210 can machine the part 222. The coordinate system 216 center is compensated by adjusting the coordinate system 216 with the actual part center to align the part 222 and the CNC machine 210.

To define the coordinate system 216 and the A-axis 224, nominal position information is input in the controller 226 including a nominal table center ($Tx_A$, $Ty_A$, $Tz_A$), a nominal part center ($Px_0$, $Py_0$, $Pz_0$), and a nominal table rotation (A). CMM measures the deviation of the features of actual part machine in the CNC machine 210, and the deviations are converted to offset values. The CNC machine 210 utilizes the nominal and offset information to compensate the coordinate system 216 and the A-axis 224 to the actual part center.

Once the part 222 is clamped on the fixture 220 and the cutting tool 223 machines multiple features 240 (only one shown) and surfaces 242 on the part 222. The features 240 and surfaces 242 are measured to determine the actual position of the part 222. Each of the features 240 and the surfaces 242 are machined at multiple rotational positions of the CNC machine 210 about the A-axis 224.

The coordinate system 216 travels with the table 212. For a four-axis A rotary table CNC machine 210 the table 212 rotary axis A aligns with the X-axis of the coordinate system 216 when A is at zero degrees. Therefore, there is an A rotational offset and linear offsets for the Y-axis and the Z-axis, but there is only linear offset for the X-axis.

For a four-axis A rotary table CNC machine 210 there are six degrees of freedom of error by which the actual part 222 center may be offset from the nominal part center. The table error may be compensated in the Y-direction by the table offset ($\Delta Ty_A$) and in the Z-direction by the table offset ($\Delta Tz_A$). The fixture errors may be compensated in the X-direction by the fixture offset ($\Delta Px_A$), in the Y-direction by the fixture offset ($\Delta Py_A$), and in the Z-direction by the fixture offset ($\Delta Pz_A$). The table rotational error may be compensated in the A-direction by the rotational offset ($\Delta A$) about the A-axis 224. Please note, all subscripts refer to the rotational orientation about the A-axis 224 at which each particular value refers to. Thus, a subscript 0 refers to the fixtures offsets at the zero-degrees A position and a subscript A refers to the table offsets for a four-axis A machine 210.

Although there are six degrees of freedom of error for the part 222, for a four-axis machine there are only four controllable axes on which the coordinate system 216 may be adjusted to compensate for the six degrees of freedom of error. Using the nominal table center ($Tx_A$, $Ty_A$, $Tz_A$), the nominal part center ($P_0$, $Py_0$, $Pz_0$), the nominal table rotation (A) and the corresponding offsets, the coordinates system 216 is translated on each of the four-axes. This is represented by the set of equations below which provide a global offset compensation for the CNC machine 210, where Wx is the X-axis position, Wy is the Y-axis position, Wz is the Z-axis position and Wa is the A-axis 228 position from machine absolute zero:

$Wx = Tx_A + Px_0 + \Delta Px_0;$ $Wy = (Ty_A + \Delta Ty_A) + (Py_0 + \Delta Py_0)\cos A + (Pz_0 + \Delta Pz_0)\sin A;$ $Wz = (Tz_A + \Delta Tz_A) - (Py_0 + \Delta Py_0)\sin A + (Pz_0 + \Delta Pz_0)\cos A;$ and $Wa = A + \Delta A.$ The controller 226 translates the table 212 and the fixture 220 by the four axes by the offset amount for each to adjust the coordinate system 216 and the A-axis 228 and therefore compensate for the deviations. Once the six offsets have been translated by the controller 226 then the coordinate system 216 and the A-axis 224 are compensated by the global offset, which compensates for all of the controllable axes of the CNC machine 210. The part 222 may be machined by the CNC machine 210 once the global offset compensation has been applied. After the part 222 has been machined by the CNC machine 210 it may be measured by a CMM to check the accuracy.

FIG. 4 illustrates a partial view of a portion of a fourth embodiment of a CNC machine 310. The CNC machine is a five-axis A-on-B rotary table CNC machine 310. The CNC machine 310 has a first or A-table 312 which is installed on a second or B-table 344. The embodiment in FIG. 4 differs from the embodiment above in that the CNC machine 310 is a five-axis machine rather than a four-axis machine and the global offset compensation for the table will accordingly be different as explained below. The A-table 312 rotates about the A-axis (shown at 324) and the B-table 344 rotates about the B-axis (shown at 346). The rotation of the A-table 312 is represented by arrow 328 and by arrow 348 for the B-table 344.

A fixture 320 and a part 322 may be assembled on the A-table 312, as illustrated at 314. A coordinate system 316 is associated with the CNC machine 310. A spindle 318 is operatively connected to the CNC machine 310. The movements of the spindle 318 can be adjusted by the coordinate system 316 for the CNC machine 310. The spindle 318 is oriented along the negative Z-axis of the coordinate system 316. A cutting tool 323 is clamped on the spindle 318 to machine the part 322. The spindle 318 may be rotated such that the cutting edge of tool 323 can remove material from part 322. The machined part 322 is measured by a CMM machine or a gauge for dimensional data.

The spindle 318 and the A-table 312 and the B-table 344 are operatively connected to a controller 326 to provide input from the spindle 318, the A-table 312 and the B-table 344. The controller 326 also controls the CNC machine 310 including the rotational position of the A-table 312 and the B-table 344.

A fixture 320 is mounted to the A-table 312 and a part 322 is mounted on the fixture 320. The fixture 320 accommodates for different parts 322 to be mounted to the table 312. The fixture 320 is used to accommodate a variety of support locations on the parts 322 such that different parts 322 may be mounted to a common table 312. The A-table 312, the B-table 344 and the fixture 320 can be compensated to align with the CNC machine 310. The A-table 312 for the CNC machine 310 is configured to receive fixture 320. One part 322 is clamped on the fixture 320 and the fixture 320 is mounted to the machine table 312. The fixture 320 includes a plurality of locators that are used to support the part 322 on the fixture 320. In the embodiment shown, there is at least one primary locator 330, a secondary locator 332 and three tertiary locators 334. The part 322 defines locator holes 336, 338 that correspond to some of the plurality of locators 330-334. However, fixture 320 is designed to receive multiple different parts 322. Therefore, the part 322 may only define locator holes 336, 338 corresponding to some of the plurality of locators 330-334 on the fixture 320. The primary locator 330 typically has a corresponding primary locator hole 336 and the secondary locator 332 typically has a secondary locator hole 338. Additional locator holes are not shown, but may correspond to any or all of the tertiary locators 334.

The actual part 322 position may not be located properly with respect to the fixture 320 and tables 312, 344 for a number of reasons, including debris, distortion of the locators resulting from fixture wear, wear on the part locator holes resulting from repeated locating, distortion of the part 322 due to clamping pressure and cutting force, and drifting of the tables 312, 344 and/or the fixture 320. The tables 312, 344 and the fixture 320 can be compensated to align the CNC machine 310. The actual part 322 position compared to the nominal part position, may include any linear deviations and rotational deviations resulting from the part 322 and/or fixture 320 being tilted relative to any of the planes of the coordinate system 316. Any misalignment of the part 322 may causes the parts 322 to be shifted or skewed relative to the CNC machine 310. Thus, the misalignment would result in the CNC machine 310 machining at the wrong locations on that part 322. Therefore, the coordinate system 316, the A-axis 324, and the B-axis 346 must be compensated to the part 322 before the CNC machine 310 can machine the part 322. The coordinate system 316 center is compensated electronically with the actual part 322 center and orientation to the CNC machine 310.

To define the coordinate system 316, the A-axis 324 and the B-axis 346 nominal position information is input in the controller 326 including a nominal A-table center ($Tx_A$, $Ty_A$, $Tz_A$), a nominal B-table center ($Tx_B$, $Ty_B$, $Tz_B$), a nominal part center ($Px_0$, $Py_0$, $Pz_0$), a nominal A-table rotation (A), and a nominal B-table rotation (B). A CMM (not shown) measures the deviation of the features 340, 342 of the actual part 322 machined in the CNC machine 310, and the deviations are converted to offset values through the use of software. The CNC machine 310 utilizes the nominal and offset information to compensate the coordinate system 316, the A-axis 324 and the B-axis 346 with the actual part center.

Once the part 322 is clamped on the fixture 320 the cutting tool 323 machines multiple features 340 (only one shown) and surfaces 342 of the part 322. The features 340 and surfaces 342 are measured by the CMM machine to determine the actual position of the part 322. Each of the features 340 and the surfaces 342 are machined at multiple rotational positions of the CNC machine 310 about the A-axis 324 and B-axis 346.

The coordinate system 316 travels with the part center as the tables 312 and 344 rotate. For a five-axis A-on-B rotary table CNC machine 310 the table 312 rotary axis A aligns with the X-axis of the coordinate system 316 and the table 344 rotary axis B aligns with the Y-axis of the coordinate system when A and B are at zero degrees. Therefore, there is an A rotational offset and linear offsets for the Y-axis and Z-axis for the first table 312, and there is a B rotational offset and linear offsets for X-axis and Z-axis for the second table 344, In addition there is a combination A and B rotational offset for the tables 312 and 344.

For a five-axis A-on-B rotary table CNC machine 310 there are nine degrees of freedom of error by which the actual part 322 may be offset from the nominal part 322 center. The A-table 312 error may be compensated in the Y-direction by the table offset ($\Delta Ty_A$) and in the Z-direction by the table offset ($\Delta Tz_A$). The B-table 344 error may be compensated in the X-direction by the table offset ($\Delta Tx_B$) and in the Z-direction by the table offset ($\Delta Tz_B$). The fixture error may be compensated in the X-direction by the fixture offset ($\Delta Px_0$), in the Y-direction by the fixture offset ($\Delta Py_0$), and in the Z-direction by the fixture offset ($\Delta Pz_0$). Finally, the rotational offsets include the rotational offset ($\Delta A$) about the A-axis 324 and the rotational offset ($\Delta B$) about the B-axis 346. Please note, all subscripts refer to the rotational orientation about the A-axis 324 and B-axis 346 at which each particular value refers to. Thus, a subscript 0 refers to the fixture offsets at zero-degrees of rotation A position and B position, a subscript A refers the table offsets to the A table of the 5-axis machine, and a subscript B refers to the B table of the 5-axis machine.

Although there are nine degrees of freedom of error for the part 322, for a five-axis machine there are only five controllable axes on which the coordinate system 316 may be adjusted to compensate for the nine degrees of freedom of error. Using the nominal A-table center ($Tx_A$, $Ty_A$, $Tz_A$), the nominal B-table center ($Tx_B$, $Ty_B$, $Tz_B$), the nominal part center ($Px_0$, $Py_0$, $Pz_0$), the nominal A-table rotation (A), the nominal B-table rotation (B), and the corresponding offsets, the coordinate system 316 origin is converted to each of the five-axes. This is represented by the set of equations below which provide a global offset compensation for the CNC machine 310, where Wx is the X-axis position, Wy is the Y-axis position, Wz is the Z-axis position, Wa is the A-axis position and Wb is the B-axis position from machine absolute zero:

$$Wx = (Tx_B + \Delta Tx_B) + (Tx_A + Px_0 + \Delta Px_0)\cos B - [(Tz_A + \Delta Tz_A) - (Py_0 + \Delta Py_0)\sin A + (Pz_0 + \Delta Pz_0)\cos A]\sin B$$

$$Wy = (Ty_B + Ty_A + \Delta Ty_A) + (Py_0 + \Delta Py_0)\cos A + (Pz_0 + \Delta Pz_0)\sin A;$$

$$Wz = (Tz_B + \Delta Tz_B) + (Tx_A + Px_0 + \Delta Px_0)\sin B + [(Tz_A + \Delta Tz_A) - (Py_0 + \Delta Py_0)\sin A + (Pz_0 + \Delta Pz_0)\cos A]\cos B;$$

$$W_A = A + \Delta A; \text{ and}$$

$$W_B = B + \Delta B.$$

The controller 326 translates the tables 312, 344 and the fixture 320 by the offset amount for each of the five-axes to adjust the coordinate system 316, the A-axis 324 and the B-axis 346 and, therefore, compensate for the deviations. Once the nine offsets have been translated by the controller 326 then the coordinate system 316 and the A-axis 324 and the B-axis 346 are compensated by the global offset, which compensates for all of the five controllable axes of the CNC machine 310. The part 322 may be machined by the CNC machine 310 once the global offset compensation has been applied. After the part 322 has been machined by the CNC machine 310 it may be measured by a CMM to check the accuracy.

Therefore, the fixture 320 has three possible linear position alignment errors. The two tables 312, 344 have total of four potential linear installation errors and two potential rotational installation errors. Both types of error are detrimental to part 342 quality. The total number of the adjustable degrees of freedom of the five-axis machine 310 is nine. The five-axis machine 310 has five controllable axes. The global offset translates the errors in the nine degrees of freedom directions into five controllable axes directions in order to electronically compensate both table 312, 344 and fixture 320 errors. All the features 340, 342 machined in various table 312, 344 positions in the operation are machined in the global coordinate system 316, which is compensated by the global offset. Therefore the nine global offsets electronically compensate all the features by the five controllable axes. The global offset also optimizes the distortion errors, part clamping location errors, as well as other unknown consistent errors.

Figure 5:
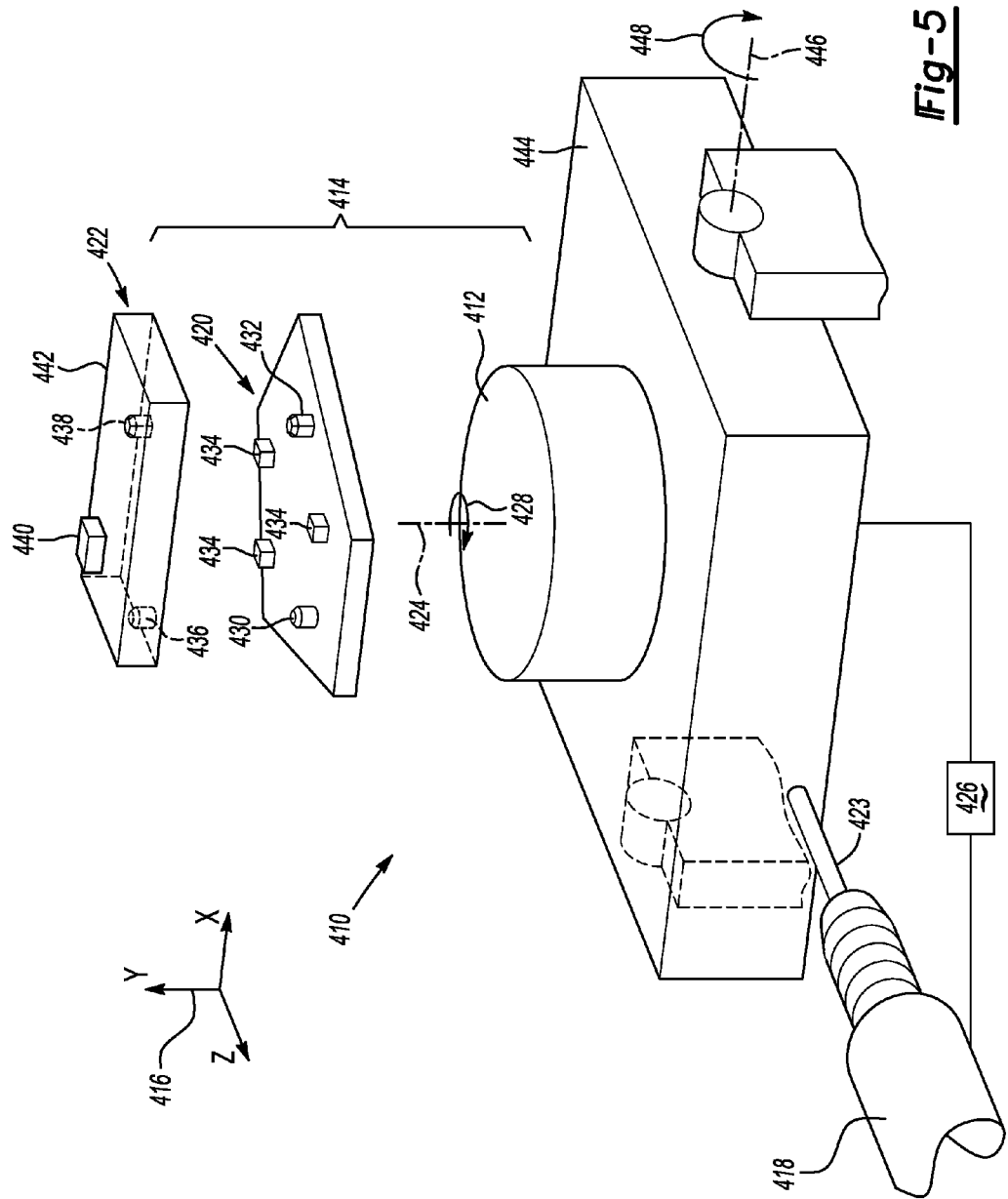
FIG. 5 is a partial schematic exploded view of a portion of a fifth CNC machine having a spindle, a fixture and a part located on a table for the fifth CNC machine

FIG. 5 illustrates a partial view of a portion of a fifth embodiment of a CNC machine 410. The CNC machine 410 has a first or B-table 412 which is installed on a second or A-table 444. The CNC machine is a five-axis B-on-A rotary table CNC machine 410. The embodiment in FIG. 5 differs from the embodiment of FIG. 4 in that the CNC machine is a B-on-A rotary table rather than an A-on-B rotary table and the global offset compensation for the table will accordingly be different as explained below. The B-table 412 rotates about the B-axis (shown at 424) and the A-table 444 rotates about the A-axis (shown at 446). The rotation of the CNC machine 410 is represented by arrow 428 for the B-table 412 and by arrow 448 for the A-table 446.

A fixture 420 and a part 422 may be assembled on the B-table 412, as illustrated at 414. A coordinate system 416 is associated with the CNC machine 410. A spindle 418 is operatively connected to the CNC machine 410 and the movements of the spindle 418 can be adjusted by the coordinated system 416 for the CNC machine 410. The spindle 418 is oriented along the Z-axis of the coordinate system 416. A cutting tool 423 is clamped on the spindle 418 to machine the part 422. The spindle 418 may be rotated such that the cutting edge of the cutting tool 423 can remove material from the part 422.

The spindle 418, the B-table 412 and the A-table 444 are operatively connected to a controller 426 to provide input from the spindle 418, the B-table 412 and the A-table 444. The controller 426 also controls the CNC machine 410 including the rotational position of the B-table 412 and the A-table 444.

A fixture 420 is mounted to the B-table 412 and a part 422 is mounted on the fixture 420. The fixture 420 accommodates for different parts 422 to be mounted to the table 412. The fixture 420 is used to accommodate a variety of support locations on the parts 422 such that different parts 422 may be mounted to a common table 412. The B-table 412, the A-table 444 and the fixture 420 can be compensated with the CNC machine 410. The B-table 412 for the CNC machine 410 is configured to receive a fixture 420. One part 422 is clamped on the fixture 420 and mounted to the machine table 412. The fixture 420 includes a plurality of locators that are used to support the part 422 on the fixture 420. In the embodiment shown, there is at least one primary locator 430, a secondary locator 432 and three tertiary locators 434. The part 422 defines locator holes 436, 438 that correspond to some of the plurality of locators 430-434. However, each fixture 420 is designed to receive multiple different parts 422. Therefore, the part 422 may only define locator holes 436, 438 corresponding to some of the plurality of locators 430-434 on the fixture 420. The primary locator 430 typically has a corresponding primary locator hole 436 and the secondary locator 432 typically has a secondary locator hole 438. Additional locator holes are not shown, but may correspond to any or all of the tertiary locators 434.

The actual part 422 position may not be located properly with respect to the fixture and tables for a number of reasons including debris, distortion of the locators resulting from fixture wear, wear on the part locator holes resulting from repeated locating, distortion of the part 422 due to clamping pressure and cutting force, and drifting of the tables 412, 444 and/or the fixture 420 that has occurred since the tables 412, 444 and the fixture 420 were compensated with the CNC machine 410. The actual part 422 position compared to the nominal part position, may include any linear deviations and rotational deviations resulting from the part 422 and/or fixture 420 being tilted relative to any of the planes of the coordinate system 416. Any misalignment of the part 422 may cause the parts 422 to be shifted or skewed relative to the CNC machine 410. Thus, the misalignment would result in the CNC machine 410 machining at the wrong locations on that part 422. Therefore, the coordinate system 416, the B-axis 424, and the A-axis 446 must be compensated with the part 422 before the CNC machine 410 can machine the part 422. The coordinate system 416 center is compensated electronically with the actual part 422 center and orientation to the CNC machine 410.

To define the coordinate system 416, the B-axis 424 and the A-axis 446 nominal position information is input in the controller 426 including a nominal A-table center ($Tx_A$, $Ty_A$, $Tz_A$), a nominal B-table center ($Tx_B$, $Ty_B$, $Tz_B$), a nominal center ($Px_0$, $Py_0$, $Pz_0$), a nominal A-table rotation (A), and a nominal B-table rotation (B). A CMM machine measures the deviation of the features of the actual part 422 machine on the CNC machine 410, and the deviations are converted to offset values through the use of a software. The CNC machine 410 utilizes the nominal and offset information to compensate the coordinate system 416, the B-axis 424 and the A-axis 446 with the actual part center.

Once the part 422 is clamped on the fixture 420 the spindle 418 machines multiple features 440 (only one shown) and surfaces 442 on the part 422. The features 440 and surfaces 442 are measured by the CMM machine to determine the actual position of the part 422. Each of the features 440 and the surfaces 442 are machined at multiple rotational positions of the CNC machine 410 about the B-axis 424 and A-axis 446.

The coordinate system 416 travels with the part 422 center as the tables 412 and 444 rotate. For a five-axis B-on-A rotary table CNC machine 410 the table 412 rotary axis B aligns with the Y-axis of the coordinate system 416 and the table 444 rotary axis A aligns with the X-axis of the coordinate system when A and B are at zero degrees. Therefore, there is a B rotational offset and linear offsets for the X-axis and the Z-axis for the first table 412, and there is an A rotational offset and linear offsets from the Y-axis and the Z-axis for the second table 444. In addition, there is a combination A and B rotational offset for the tables 412, 444.

For a five-axis B-on-A rotary table CNC machine 410 there are nine degrees of freedom of error by which the actual part 422 may be offset from the nominal part 422 center. The A-table 444 error may be compensated in the Y-direction by table offset ($\Delta Ty_A$) and in the Z-direction by the table offset ($\Delta Tz_A$). The B-table 412 error may be compensated in the X-direction by the table offset ($\Delta Tx_B$) and in the Z-direction by the table offset ($\Delta Tz_B$). The fixture error may be compensated in the X-direction by the fixture offset ($\Delta Px_0$), in the Y-direction by the fixture offset ($\Delta Py_0$), and in the Z-direction by the fixture offset ($\Delta Pz_0$). Finally, the rotational offset includes the rotational offset ($\Delta A$) about the A-axis 446 and the rotational offset ($\Delta B$) about the B-axis 424. Please note, all subscripts refer to the rotational orientation about the A-axis 446 and B-axis 424 at which each particular value refers to. Thus, a subscript 0 refers to the fixture offsets at zero-degrees of rotation A position and B position, a subscript A refers to the table offsets of the A-table 444, and a subscript B refers to the table offsets of the B-table 412.

Although there are nine degrees of freedom of error for the part 422, for a five-axis machine there are only five controllable axes on which the coordinate system 416 may be adjusted to compensate for the nine degrees of freedom of error. Using the nominal A-table center ($Tx_A$, $Ty_A$, $Tz_A$), the nominal B-table center ($Tx_B$, $Ty_B$, $Tz_B$), the nominal part center ($Px_0$, $Py_0$, $Pz_0$), the nominal A-table rotation (A), the nominal B-table rotation (B), and the corresponding offsets, the coordinate system 416 origin is translated on each of the five-axes. This is represented by the set of equations below which provide a global offset compensation for the CNC machine 410, where Wx is the X-axis position, Wy is the Y-axis position, Wz is the Z-axis position, Wa is the A-axis position and Wb is the B-axis position:

$$Wx = (Tx_A + Tx_B + \Delta Tx_B) + (Px_0 + \Delta Px_0)\cos B - (Pz_0 + \Delta Pz_0)\sin B;$$

$$Wy = (Ty_A + \Delta Ty_A) + (Ty_B + Py_0 + \Delta Py_0)\cos A + [(Tz_B + \Delta Tz_B) + (Px_0 + \Delta Px_0)\sin B + (Pz_0 + \Delta Pz_0)\cos B]\sin A;$$

$$Wz = (Tz_A + \Delta Tz_A) - (Ty_B + Py_0 + \Delta Py_0)\sin A + [(Tz_B + \Delta Tz_B) + (Px_0 + \Delta Px_0)\sin B + (Pz_0 + \Delta Pz_0)\cos B]\cos A;$$

$$W_A = A + \Delta A; \text{ and}$$

$$W_B = B + \Delta B.$$

The controller 426 translates the tables 412, 444 and the fixture 420 by the offset amount for each of the five-axes to adjust the coordinate system 416, the B-axis 424 and the A-axis 446 and, therefore, compensate for the deviations. Once the nine offsets have been translated by the controller 426 then the coordinate system 416 and the B-axis 424 are compensated by the global offset, which compensates for all of the controllable axes of the CNC machine 410. The part 422 may be machined by the CNC machine 410 once the global offset compensation has been applied. After the part 422 has been machined by the CNC machine 410 it may be measured by a CMM to check the accuracy.

Figure 6:
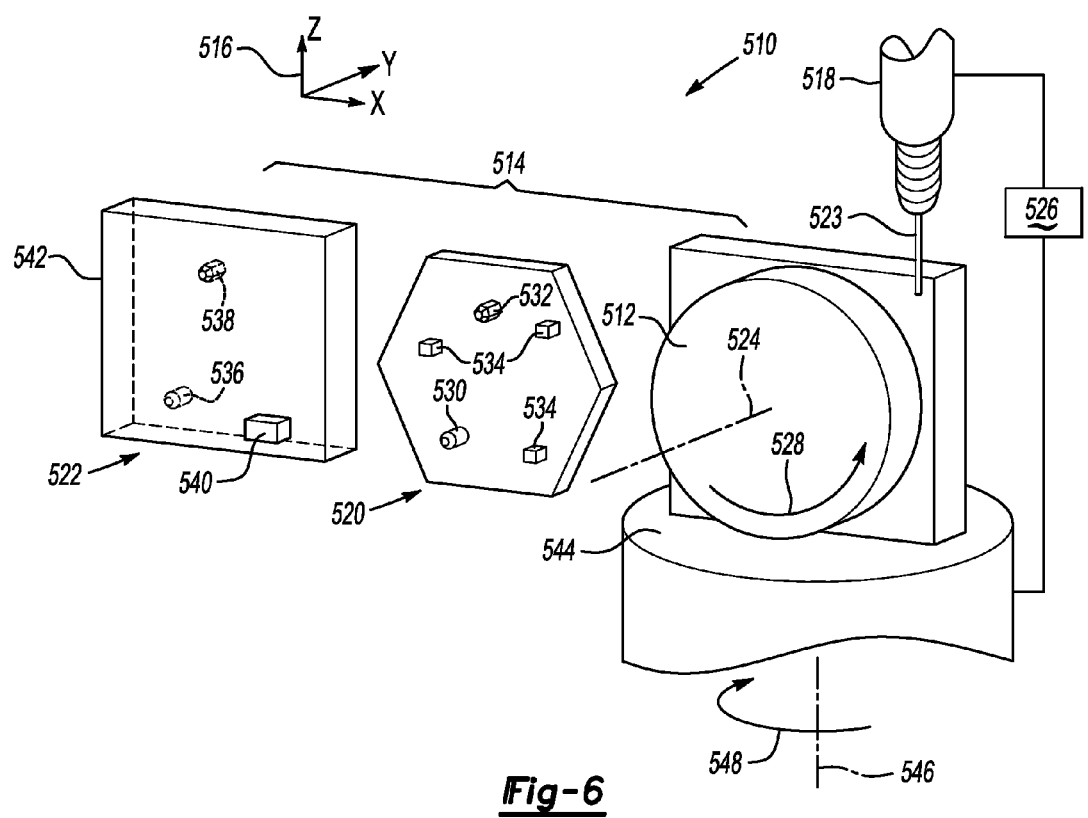
FIG. 6 is a partial schematic exploded view of a portion of a sixth CNC machine having a spindle, a fixture and a part located on a table for the sixth CNC machine.

FIG. 6 illustrates a partial view of a portion of a sixth embodiment of a CNC machine 510. The CNC machine is a five-axis B-on-C rotary table CNC machine 510. The CNC machine 510 has a first or B-table 512 which is installed on a second or C-table 544. The embodiment in FIG. 6 differs from the embodiment of FIG. 4 in that the CNC machine is a B-on-C rotary table rather than an A-on-B rotary table and the global offset compensation for the table will accordingly be different as explained below. The B-table 512 rotates about the B-axis (shown at 524) and the C-table 544 rotates about the C-axis (shown at 546). The rotation of the CNC machine 510 is represented by arrow 528 for the B-table 512 and by arrow 548 for the C-table 544.

A fixture 520 and a part 522 may be assembled on the B-table 512, as illustrated at 514. A coordinate system 516 is associated with the CNC machine 510. A spindle 518 is operatively connected to the CNC machine 510 and can be adjusted by the coordinate system 516 for the CNC machine 510. The spindle 518 is oriented along the Z-axis of the coordinate system 516. A cutting tool 523 is clamped on the spindle 518 to machine the part 522. The spindle 518 may be rotated such that the cutting edge of the cutting tool 523 can remove material from the part 522. The machined part 522 is measured by a CMM machine or a gauge for dimensional data.

The spindle 518, the B-table 512 and the C-table 544 are operatively connected to a controller 526 to provide input from the spindle 518, the B-table 512 and the C-table 544. The controller 526 also controls the CNC machine 510 including the rotational position of the B-table 512 and the C-table 544.

A fixture 520 is mounted to the B-table 512 and a part 522 is mounted on the fixture 520. The fixture 520 accommodates for different parts 522 to be mounted to the table 512. The fixture 520 is used to accommodate a variety of support locations on the parts 522 such that different parts 522 may be mounted to a common table 512. The B-table 512, the C-table 544 and the fixture 520 can be compensated with the CNC machine 510. The B-table 512 for the CNC machine 510 is configured to receive a fixture 520. One part 522 is clamped on the fixture 520 and mounted to the CNC machine 510. The fixture 520 includes a plurality of locators that are used to support the part 522 on the fixture 520. In the embodiment shown, there is at least one primary locator 530, a secondary locator 532 and three tertiary locators 534. The part 522 defines locator holes 536, 538 that correspond to some of the plurality of locators 530-534. However, each fixture 520 is designed to receive multiple different parts 522. Therefore, the part 522 may only define locator holes 536, 538 corresponding to some of the plurality of locators 530-534 on the fixture 520. The primary locator 530 typically has a corresponding primary locator hole 536 and the secondary locator 532 typically has a secondary locator hole 538. Additional locator holes are not shown, but may correspond to any or all of the tertiary locators 534.

The actual part 522 position may not be located properly with respect to the fixture and tables for a number of reasons including debris, distortion of the locators resulting from fixture wear, wear on the part locator holes resulting from repeated location, distortion of the part 522 due to clamping pressure and cutting force, and drifting of the tables 512, 544 and/or the fixture 520. The actual part 522 position compared to the nominal part position, may include any linear deviations and rotational deviations resulting from the part 522 and/or fixture 520 being tilted relative to any of the planes of the coordinate system 516. Any misalignment of the part 522 may causes the parts 522 to be shifted or skewed relative to the CNC machine 510. Thus, the misalignment would result in the CNC machine 510 machining at the wrong locations on that part 522. Therefore, the coordinate system 516, the B-axis 524, and the C-axis 546 must be compensated to the part 522 before the CNC machine 510 can machine the part 522. The coordinate system 516 center is compensated electronically with the actual part 522 center and orientation to properly locate the part 522 to the CNC machine 510.

To define the coordinate system 516, B-axis 524 and the C-axis 546 nominal position information is input in the controller 526 including a nominal B-table center ($Tx_B$, $Ty_B$, $Tz_B$), a nominal C-table center ($Tx_C$, $Ty_C$, $Tz_C$), a nominal part center ($Px_0$, $Py_0$, $Pz_0$), a nominal B-table rotation (B), and a nominal C-table rotation (C). The CMM machine measures the deviation of the features of the actual part 522 machine on the CNC machine 510, and the deviations are converted to offset values through the use of a software. The CNC machine 510 utilizes the nominal and offset information to compensate for the coordinate system 516, the B-axis 524 and the C-axis 546 with the actual part center.

Once the part 522 is clamped on the fixture 520 the cutting tool 523 machines multiple features 540 (only one shown) and surfaces 542 on the part 522. The features 540 and surfaces 542 are measured by the CMM machine to determine the actual position of the part 522. Each of the features 540 and the surfaces 542 are machined at multiple rotational positions of the CNC machine 510 about the B-axis 524 and C-axis 546.

The coordinate system 516 travels with the part center 522 as the tables 512 and 544 rotate. For a five-axis B-on-C rotary table CNC machine 510 the table 512 rotary axis B aligns with the Y-axis of the coordinate system 516 and the table 544 rotary axis C aligns with the Z-axis of the coordinate system 516 when B and C are at zero degrees. Therefore, there is a B rotational offset and linear offsets for the X-axis and the Z-axis for the first table 512, and there is a C rotational offset and linear offsets for the X-axis and the Y-axis for the second table 544. In addition, there is a combination B and C rotational offset for the tables 512 and 544.

For a five-axis B-on-C rotary table CNC machine 510 there are nine degrees of freedom of error by which the actual part 522 may be offset from the nominal part 522 center. The B-table 512 error may be compensated in the X-direction by the table offset ($\Delta Tx_B$) and in the Z-direction by the table offset ($\Delta Tz_B$). The C-table 544 error may be compensated in the the X-direction by the table offset ($\Delta Tx_C$) and in the Y-direction by the table offset ($\Delta Ty_C$). The fixture error may be compensated in the X-direction by the fixture offset ($\Delta Px_0$), in the Y-direction by the fixture offset ($\Delta Py_0$), and in the Z-direction by the fixture offset ($\Delta Pz_0$). Finally, the rotational offset includes the rotational offset ($\Delta B$) about the B-axis 524 and the rotational offset ($\Delta C$) about the C-axis 546. Please note, all subscripts refer to the rotational orientation about the B-axis 524 and C-axis 546 at which each particular value refers to. Thus, a subscript 0 refers to the fixture offsets at zero-degrees of rotation B position and C position, a subscript B refers to the table offsets to the B-table 512 and, and a subscript C refers to the table offsets to the C-table 5442.

Although there are nine degrees of freedom of error for the part 522, for a five-axis machine there are only five controllable axes on which the coordinate system 516 may be adjusted to compensate for the nine degrees of freedom of error. Using the nominal B-table center ($Tx_B$, $Ty_B$, $Tz_B$), the nominal C-table center ($Tx_C$, $Ty_C$, $Tz_C$), the nominal part center ($Px_0$, $Py_0$, $Pz_0$), the nominal B-table rotation (B), the nominal C-table rotation (C), and the corresponding offsets, the coordinate system 516 origin is translated on each of the five-axes. This is represented by the set of equations below which provide a global offset compensation for the CNC machine 510, where Wx is the X-axis position, Wy is the Y-axis position, Wz is the Z-axis position, Wb is the B-axis position and Wc is the C-axis position:

$$Wx = (Tx_C + \Delta Tx_C) + [(Tx_B + \Delta Tx_B) + (Px_0 + \Delta Px_0)\cos B - (Pz_0 + \Delta Pz_0)\sin B]\cos C + (Ty_B + Py_0 + \Delta Py_0)\sin C;$$

$$Wy = (Ty_C + \Delta Ty_C) - [(Tx_B + \Delta Tx_B) + (Px_0 + \Delta Px_0)\cos B - (Pz_0 + \Delta Pz_0)\sin B]\sin C + (Ty_B + Py_0 + \Delta Py_0)\cos C;$$

$$Wz = (Tz_C + Tz_B + \Delta Tz_B) + (Px_0 + \Delta Px_0)\sin B + (Pz_0 + \Delta Pz_0)\cos B;$$

$$W_B = B + \Delta B; \text{ and}$$

$$W_C = C + \Delta C.$$

The controller 526 translates the tables 512, 544 and the fixture 520 by the offset amount for each of the five-axes to adjust the coordinate system 516, the B-axis 524 and the C-axis 546 and, therefore, compensate for the deviations. Once the nine offsets have been translated by the controller 526 then the coordinate system 516 and the C-axis 546 are compensated by the global offset, which is the compensation for all of the nine controllable axes of the CNC machines 510. The part 522 may be machined by the CNC machine 510 once the global offset compensation has been applied. After the part 522 has been machined by the CNC machine 510 it may be measured by a CMM to check the accuracy.

Figure 7:
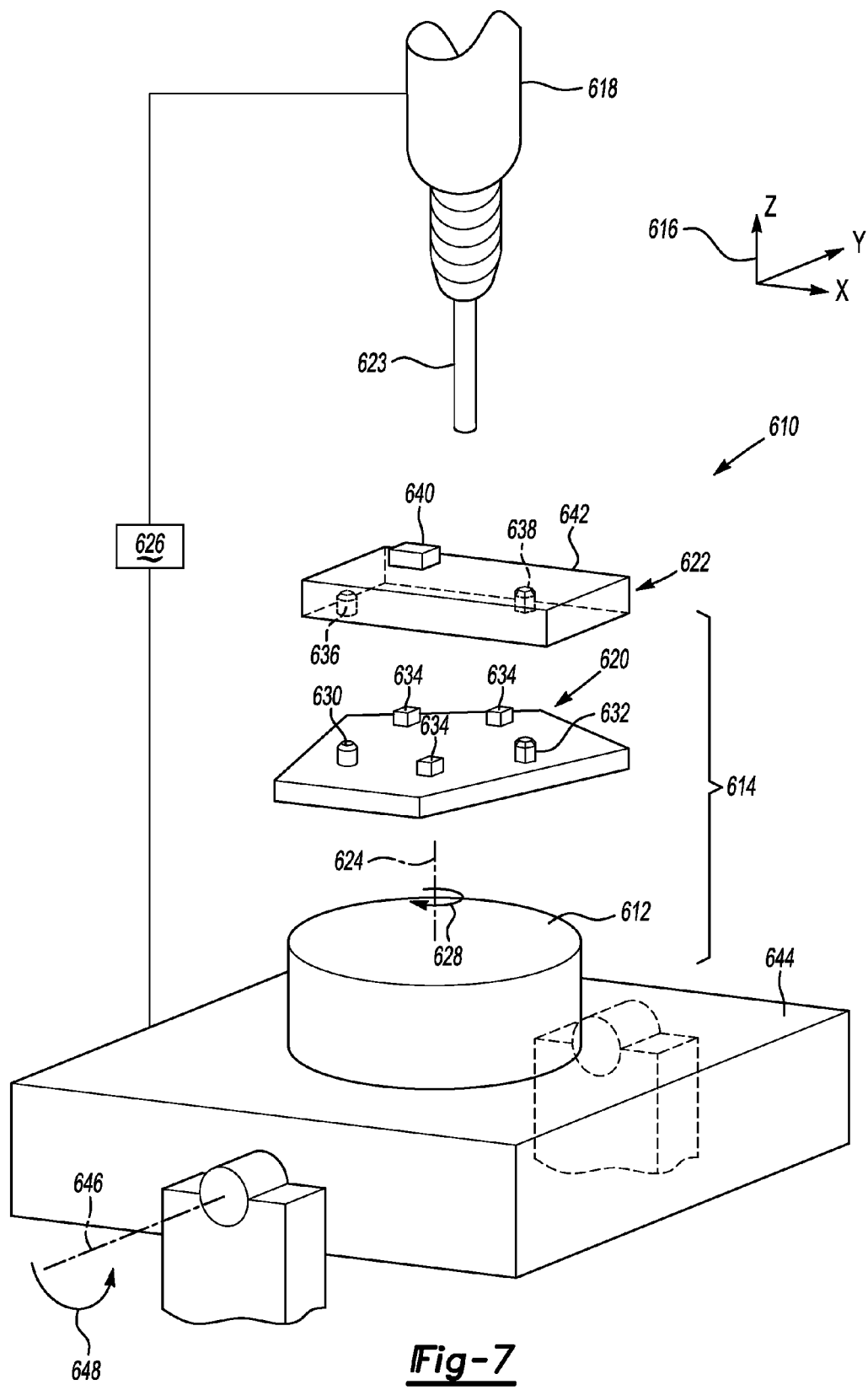
FIG. 7 is a partial schematic exploded view of a portion of a seventh CNC machine having a spindle, a fixture and a part located on a table for the seventh CNC machine.

FIG. 7 illustrates a partial view of a portion of a seventh embodiment of a CNC machine 610. The CNC machine is a five-axis C-on-B rotary table CNC machine 610. The CNC machine 610 has a first or C-table 612 which is installed on a second or B-table 644. The embodiment in FIG. 7 differs from the embodiment of FIG. 4 in that the CNC machine is a C-on-B rotary table rather than an A-on-B rotary table and the global offset compensation for the table will accordingly be different as explained below. The C-table 612 rotates about the C-axis (shown at 624) and the B-table 644 rotates about the B-axis (shown at 646). The rotation of the CNC machine 610 is represented by arrow 628 for the C-table 612 and by arrow 648 for the B-table 644.

A fixture 620 and a part 622 may be assembled on the C-table 612, as illustrated at 614. A coordinate system 616 is associated with the CNC machine 610. A spindle 618 is operatively connected to the CNC machine 610 and can be adjusted by the coordinate system 616 for the CNC machine 610. The spindle 618 is oriented along the Z-axis of the coordinate system 616. A cutting tool 623 is clamped on the spindle 618 to machine the part 622. The spindle 618 may be rotated such that the cutting edge of the cutting tool 623 can remove material from the part 622. The machined part 622 is measured by a CMM machine or a gauge for dimensional data.

The spindle 618, the C-table 612 and the B-table 644 are operatively connected to a controller 626 to provide input from the spindle 618, the C-table 612 and the B-table 644. The controller 626 also controls the CNC machine 610 including the rotational position of the C-table 612 and the B-table 644.

A fixture 620 is mounted to the C-table 612 and a part 622 is mounted on the fixture 620. The fixture 620 accommodates for different parts 622 to be mounted to the table 612. The fixture 620 is used to accommodate a variety of support locations on the parts 622 such that different parts 622 may be mounted to a common table 612. The C-table 612, the B-table 644 and the fixture 620 can be compensated with the CNC machine 610. The C-table 612 for the CNC machine 610 is configured to receive a fixture 620. One part 622 is clamped on the fixture 620 and mounted to the CNC machine 610. The fixture 620 includes a plurality of locators that are used to support the part 622 on the fixture 620. In the embodiment shown, there is at least one primary locator 630, a secondary locator 632 and three tertiary locators 634. The part 622 defines locator holes 636, 638 that correspond to some of the plurality of locators 630-634. However, each fixture 620 is designed to receive multiple different parts 622. Therefore, the part 622 may only define locator holes 636, 638 corresponding to some of the plurality of locators 630-634 on the fixture 620. The primary locator 630 typically has a corresponding primary locator hole 636 and the secondary locator 632 typically has a secondary locator hole 638. Additional locator holes are not shown, but may correspond to any or all of the tertiary locators 634.

The actual part 622 position may not be located properly with respect to the fixture 620 and the table 612, 644 for a number of reasons including debris, distortion of the locators resulting from fixture wear, wear on the part locator holes from repeated locating, distortion of the part 622 due to clamping pressure and cutting force, and drifting of the table 612, 644 and/or the fixture 620. The actual part 622 position compared to the nominal part position, may include any linear deviations and rotational deviations resulting from the part 622 and/or fixture 620 being tilted relative to any of the planes of the coordinate system 616. Any misalignment of the part 622 may causes the parts 622 to be shifted or skewed relative to the CNC machine 610. Thus, the misalignment would result in the CNC machine 610 machining at the wrong locations on that part 622. Therefore, the coordinate system 616, the C-axis 624, and the B-axis 646 must be compensated to the part 622 before the CNC machine 610 can machine the part 622. The coordinate system 616 center is compensated electronically to the actual part center and orientation of the CNC machine 610.

To define the coordinate system 616, the C-axis 624 and the B-axis 646 nominal position information is input in the controller 626 including a nominal B-table center ($Tx_B$, $Ty_B$, $Tz_B$), a nominal C-table center ($Tx_C$, $Ty_C$, $Tz_C$), a nominal part center ($Px_0$, $Py_0$, $Pz_0$), a nominal B-table rotation (B), and a nominal C-table rotation (C). The CMM machine measures the deviation of the features of the actual part 622 machined on the CNC machine 610, and the deviations are converted to offset values. The CNC machine 610 utilizes the nominal and offset information to compensate the coordinate system 616, the C-axis 624 and the B-axis 646 with the actual part center.

Once the part 622 is clamped on the fixture 620 the cutting tool 623 machines multiple features 640 (only one shown) and surfaces 642 on the part 622. The features 640 and surfaces 642 are measured by the CMM machine to determine the actual position of the part 622. Each of the features 640 and the surfaces 642 are machined at multiple rotational positions of the CNC machine 610 about the C-axis 624 and B-axis 646.

The coordinate system 616 travels with the part 622 center as the tables 612 and 644 rotate. For a five-axis C-on-B rotary table CNC machine 610 the table 612 rotary axis C aligns with the Z-axis of the coordinate system 616 and the table 644 rotary axis B aligns with the Y-axis of the coordinate system when C and B are at zero degrees. Therefore, there is a C rotational offset and linear offsets for the X-axis and the Y-axis for the first table 612, and there is a B rotational offset and linear offsets for the X-axis and the Z-axis for the second table 644. In addition, there is a combination A and B rotational offset for the tables 612 and 644.

For a five-axis C-on-B rotary table CNC machine 610 there are nine degrees of freedom of error by which the part 622 may be offset from the nominal part 622 center. The B-table 644 error may be compensated in the X-direction by the table offset ($\Delta Tx_B$) and in the Z-direction by the table offset ($\Delta Tz_B$). The C-table 612 error may be compensated in the X-direction by the table offset ($\Delta Tx_C$) and in the Y-direction table offset ($\Delta Ty_C$). The fixture error may be compensated in X-direction by the fixture offset ($\Delta Px_0$), in the Y-direction by the fixture offset ($\Delta Py_0$), and in the Z-direction by the fixture offset ($\Delta Pz_0$). Finally, the rotational offset includes the rotational offset ($\Delta B$) about the B-axis 646 and the rotational offset ($\Delta C$) about the C-axis 624. Please note, all subscripts refer to the rotational orientation about the C-axis 624 and B-axis 646 at which each particular value refers to. Thus, a subscript 0 refers to the fixture offsets at zero-degrees of rotation C position and B position, a subscript B refers to the table offsets to the B-table 644, and a subscript C refers to the table offsets to the C-table 612.

Although there are nine degrees of freedom of error for the part 622, for a five-axis machine there are only five controllable axes on which the coordinate system 616 may be adjusted to compensate for the nine degrees of freedom of error. Using the nominal B-table center ($Tx_B$, $Ty_B$, $Tz_B$), the nominal C-table center ($Tx_C$, $Ty_C$, $Tz_C$), the nominal part center ($Px_0$, $Py_0$, $Pz_0$), the nominal B-table rotation (B), the nominal C-table rotation (C), and the corresponding offsets, the coordinate system 616 origin is translated on each of the five-axes. This is represented by the set of equations below which provide a global offset compensation for the CNC machine 610, where Wx is the X-axis position, Wy is the Y-axis position, Wz is the Z-axis position, Wb is the C-axis position and We is the B-axis position:

$$Wx = (Tx_B + \Delta Tx_B) + [(Tx_C + \Delta Tx_C) + (Px_0 + \Delta Px_0)\cos C + (Py_0 + \Delta Py_0)\sin C]\cos B - (Tz_C + Pz_0 + \Delta Pz_0)\sin B;$$

$$Wy = (Ty_B + Ty_C + \Delta Ty_C) - (Px_0 + \Delta Px_0)\sin C + (Py_0 + \Delta Py_0)\cos C;$$

$$Wz = (Tz_B + \Delta Tz_B) + [(Tx_C + \Delta Tx_C) + (Px_0 + \Delta Px_0)\cos C + (Py_0 + \Delta Py_0)\sin C]\sin B + (Tz_C + Pz_0 + \Delta Pz_0)\cos B;$$

$$W_B = B + \Delta B; \text{ and}$$

$$W_C = C + \Delta C.$$

The controller 626 translates the tables 612, 644 and the fixture 620 by the offset amount for each of the five-axes to adjust the coordinate system 616, the C-axis 624 and the B-axis 646 and, therefore, compensate for the deviations. Once the nine offsets have been translated by the controller 626 than the coordinate system 616, the C-axis 624 and the B-axis 646 are compensated by the global offset, which is the compensation for all nine of the controllable axes of the CNC machine 610. The part 622 may be machined by the CNC machine 610 once the global offset compensation has been applied. After the part 622 has been machined by the CNC machine 610 it may be measured by a CMM to check the accuracy.

Figure 8:
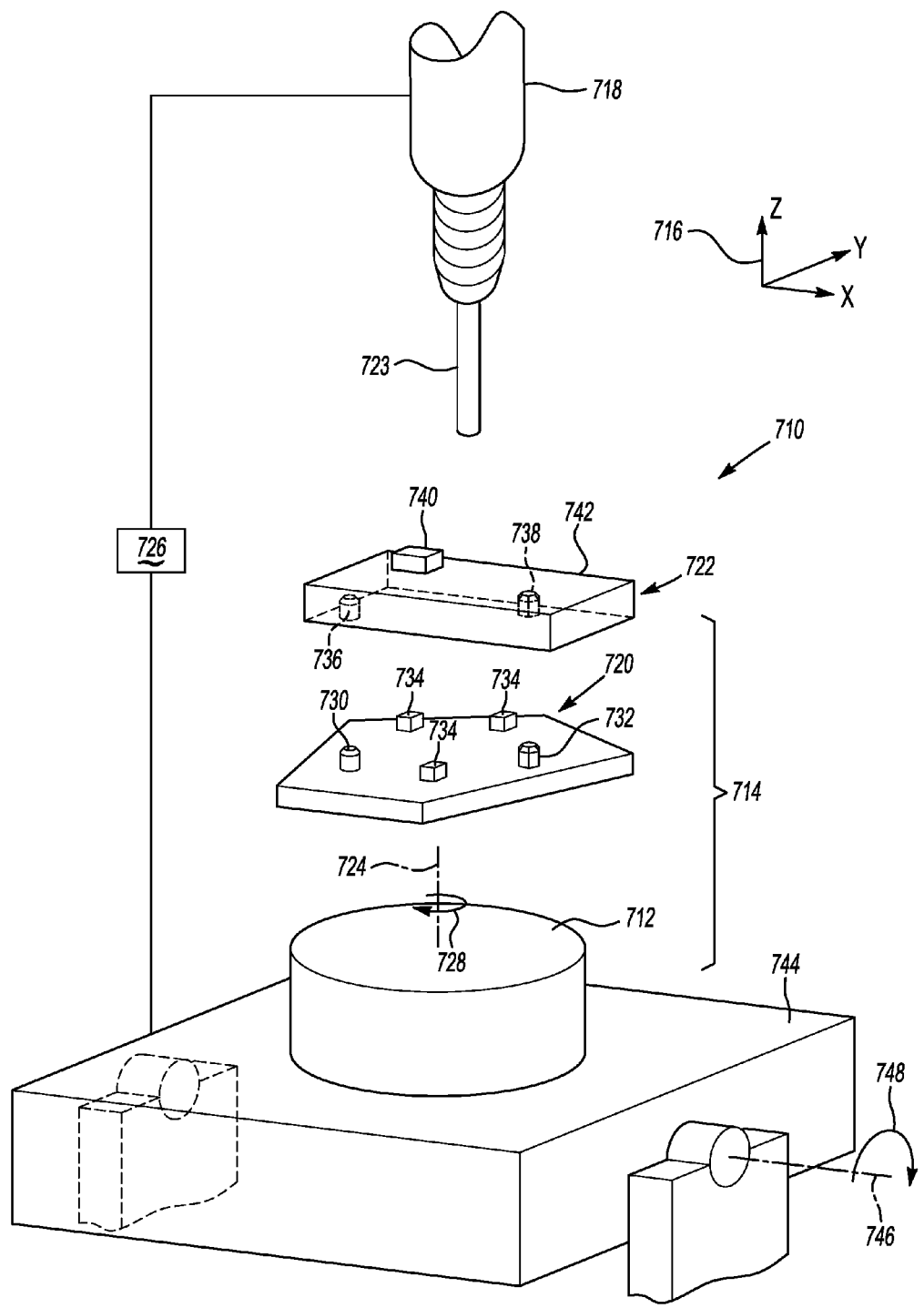
FIG. 8 is a partial schematic exploded view of a portion of a eighth CNC machine having a spindle, a fixture and a part located on a table for the eighth CNC machine.

FIG. 8 illustrates a partial view of a portion of an eighth embodiment of a CNC machine 710. The CNC machine is a five-axis C-on-A rotary table CNC machine 710. The CNC machine 710 has a first or C-table 712 which is installed on a second or A-table 744. The embodiment in FIG. 8 differs from the embodiment of FIG. 4 in that the CNC machine is a C-on-A rotary table rather than a A-on-B rotary table and the global offset compensation for the table will accordingly be different as explained below. The C-table 712 rotates about the C-axis (shown at 724) and the A-table 744 rotates about the A-axis (shown at 746). The rotation of the CNC machine 710 is represented by arrow 728 for the C-table 712 and by arrow 748 for the A-table 744.

A fixture 720 and a part 722 may be assembled on the C-table 712, as illustrated at 714. A coordinate system 716 is associated with the CNC machine 710. A spindle 718 is operatively connected to the CNC machine 710 and can be adjusted by the coordinate system 716 of the CNC machine 710. The spindle 718 is oriented along the Z-axis of the coordinate system 716. A cutting tool 723 is clamped o the spindle 718 to machine the part 722. The spindle 718 may be rotated such that the cutting tool 723 may remove material from the part 722. The machine part 722 is measured by a CMM machine (not shown) or a gauge for dimensional data.

The spindle 718, the C-table 712 and the A-table 744 are operatively connected to a controller 726 to provide input from the probe 718, the C-table 712 and the A-table 744. The controller 726 also controls the CNC machine 710 including the rotational position of the C-table 712 and the A-table 744.

A fixture 720 is mounted to the C-table 712 and a part 722 is mounted on the fixture 720. The fixture 720 accommodates for different parts 722 to be mounted to the table 712. The fixture 720 is used to accommodate a variety of support locations on the parts 722 such that different parts 722 may be mounted to a common table 712. The C-table 712, the A-table 744 and the fixture 720 can be compensated with the CNC machine 710. The C-table 712 for the CNC machine 710 is configured to receive a fixture 720. One part 722 is mounted on the fixture 720 and clamped to the machine table 712. The fixture 720 includes a plurality of locators that are used to support the part 722 on the fixture 720. In the embodiment shown, there is at least one primary locator 730, a secondary locator 732 and three tertiary locators 734. The part 722 defines locator holes 736, 738 that correspond to some of the plurality of locators 730-734. However, each fixture 720 is designed to receive multiple different parts 722. Therefore, the part 722 may only define locator holes 736, 738 corresponding to some of the plurality of locators 730-734 on the fixture 720. The primary locator 730 typically has a corresponding primary locator hole 736 and the secondary locator 732 typically has a secondary locator hole 738. Additional locator holes are not shown, but may correspond to any or all of the tertiary locators 734.

The actual part 722 position may not be located properly with respect to the fixture 720 and tables 712, 744 position for a number of reasons including debris, distortion of the locators resulting from fixture wear, wear on the part locator holes resulting from repeated locating, distortion of the part 722 due to clamping pressure and cutting force, and drifting of the table 712, 744 and/or the fixture 720. The table 712, 744 and the fixture can be compensated with the CNCN machine 710. The actual part 722 position compared to the nominal part position, may include any linear deviations and rotational deviations resulting from the part 722 and/or fixture 720 being tilted relative to any of the planes of the coordinate system 716. Any misalignment of the part 722 may causes the parts 722 to be shifted or skewed relative to the CNC machine 710. Thus, the misalignment would result in the CNC machine 710 machining at the wrong locations on that part 722. Therefore, the coordinate system 716, the C-axis 724, and the A-axis 746 must be compensated to the part 722 before the CNC machine 710 can machine the part 722. The coordinate system 716 center is compensated electronically with the actual part center and orientation to properly locate the part 722 with the CNC machine 710.

To define the coordinate system 716, C-axis 724 and the A-axis 746 nominal position information is input in the controller 726 including a nominal A-table center ($Tx_A$, $Ty_A$, $Tz_A$), a nominal C-table center ($Tx_C$, $Ty_C$, $Tz_C$), a nominal part center ($Px_0$, $Py_0$, $Pz_0$), a nominal A-table rotation (A), and a nominal C-table rotation (C). The CMM machine measures the deviation of the features of the actual part 722 on the CNC machine 710, and the deviations are converted to offset values. The CNC machine 710 utilizes the nominal and offset information to compensate the coordinate system 716, the C-axis 724 and the A-axis 746 to the actual part center.

Once the part 722 is clamped on the fixture 720 the cutting tool 723 machines multiple features 740 (only one shown) and surfaces 742 on the part 722. The features 740 and surfaces 742 are measured by the CMM machine to determine the actual position of the part 722. Each of the features 740 and the surfaces 742 are machined at multiple rotational positions of the CNC machine 710 about the C-axis 724 and A-axis 746.

The coordinate system 716 travels with the part center as tables 712 and 744 rotate. For a five-axis C-on-A rotary table CNC machine 710 the table 712 rotary axis C aligns with the Z-axis of the coordinate system 716 and the table 744 rotary axis A aligns with the X-axis of the coordinate system when C and A are at zero degrees. Therefore, there is a C rotational offset and linear offsets for the X-axis and the Y-axis for the first table 712, and there is an A rotational offset and linear offsets for the Y-axis and the Z-axis for the second table 744. In addition, there is a combination C and A rotational offset for the tables.

For a five-axis C-on-A rotary table CNC machine 710 there are nine degrees of freedom of error by which the actual part 722 may be offset from the nominal part 722 center. The A-table 744 error may be compensated in the Y-direction by the table offset ($\Delta Ty_A$) and in the Z-direction by the table offset ($\Delta Tz_A$). The C-table 712 error may be compensated in the X-direction by the table offset ($\Delta Tx_C$) and in the Y-direction by the table offset ($\Delta Ty_C$). The fixture error may be compensated in the X-direction by the fixture offset ($\Delta Px_0$), in the Y-direction by the fixture offset ($\Delta Py_0$), and in the Z-direction by the fixture offset ($\Delta Pz_0$). Finally, the rotational offset includes the rotational offset ($\Delta C$) about the C-axis 724 and the rotational offset ($\Delta A$) about the A-axis 746. Please note, all subscripts refer to the rotational orientation about the C-axis 724 and A-axis 746 at which each particular value refers to. Thus, a subscript 0 refers to the fixture offsets at zero-degrees of rotation C position and A position, a subscript A refers to the table offsets to the A-table 712, and a subscript C refers to the table offsets to the C-table 744.

Although there are nine degrees of freedom of error for the part 722, for a five-axis machine there are only five controllable axes on which the coordinate system 716 may be adjusted to compensate for the nine degrees of freedom of error. Using the nominal A-table center ($Tx_A$, $Ty_A$, $Tz_A$), the nominal C-table center ($Tx_C$, $Ty_C$, $Tz_C$), the nominal part center ($Px_0$, $Py_0$, $Pz_0$), the nominal A-table rotation (A), the nominal C-table rotation (C), and the corresponding offsets, the coordinate system 716 origin is translated on each of the five-axes. This is represented by the set of equations below which provide a global offset compensation for the CNC machine 710, where Wx is the X-axis position, Wy is the Y-axis position, Wz is the Z-axis position, Wa is the A-axis position and Wc is the C-axis position:

$$Wx = (Tx_A + Tx_C + \Delta Tx_C) + (Px_0 + \Delta Px_0)\cos C + (Py_0 + \Delta Py_0)\sin C;$$

$$Wy = (Ty_A + \Delta Ty_A) + [(Ty_C + \Delta Ty_C) - (Px_0 + \Delta Px_0)\sin C + (Py_0 + \Delta Py_0)\cos C]\cos A + (Tz_C + Pz_0 + \Delta Pz_0)\sin A;$$

$$Wz = (Tz_A + \Delta Tz_A) - [(Ty_C + \Delta Ty_C) - (Px_0 + \Delta Px_0)\sin C + (Py_0 + \Delta Py_0)\cos C]\sin A + (Tz_C + Pz_0 + \Delta Pz_0)\cos A;$$

$$W_A = A + \Delta A; \text{ and}$$

$$W_C = C + \Delta C.$$

The controller 726 translates the tables 712, 744 and the fixture 720 by the offset amount for each of the five-axes to adjust the coordinate system 716, the C-axis 724 and the A-axis 746 and, therefore, compensate for the deviations. Once the nine offsets have been translated by the controller 726 than the coordinate system 716, the C-axis 724 and the A-axis 746 are compensated by the global offset, which compensates for all of the controllable axes of the CNC machine 710. The part 722 may be machined by the CNC machine 710 once the global offset compensation has been applied. After the part 722 has been machined by the CNC machine 710 it may be measured by a CMM to check the accuracy.

Figure 9:
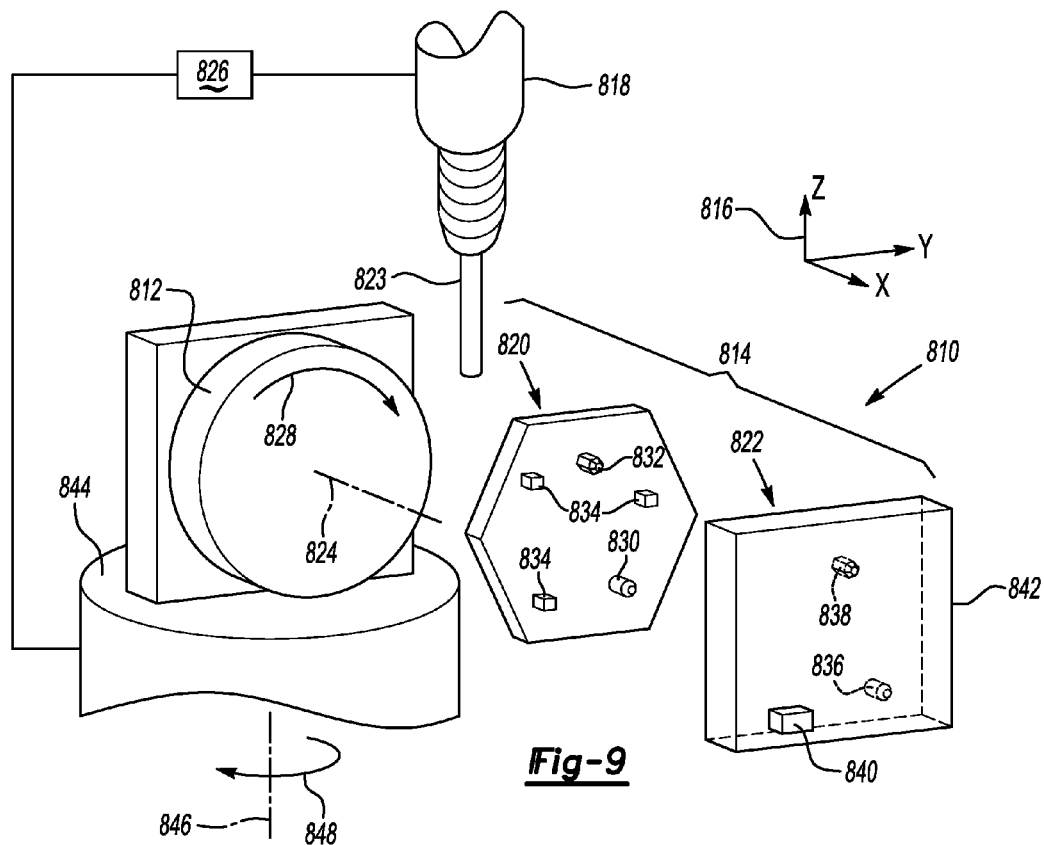
FIG. 9 is a partial schematic exploded view of a portion of a ninth CNC machine having a spindle, a fixture and a part located on a table for the ninth CNC machine.

FIG. 9 illustrates a partial view of a portion of a ninth embodiment of a CNC machine 810. The CNC machine is a five-axis A-on-C rotary table CNC machine 810. The CNC machine 810 has a first or A-table 812 which is installed on a second or C-table 844. The embodiment in FIG. 8 differs from the embodiment of FIG. 4 in that the CNC machine is an A-on-C rotary table rather than a A-on-B rotary table and the global offset compensation for the table will accordingly be different as explained below. The A-table 812 rotates about the A-axis (shown at 824) and the C-table 844 rotates about the C-axis (shown at 846). The rotation of the CNC machine 810 is represented by arrow 828 for the A-table 812 and by arrow 848 for the C-table 844.

A fixture 820 and a part 822 may be assembled on the A-table 812, as illustrated at 814. A coordinate system 816 is associated with the CNC machine 810. A spindle 818 is operatively connected to the CNC machine 810 and can be compensated to the CNC machine 810 as described below. The spindle 818 is oriented along the Z-axis of the coordinate system 816. A cutting tool 823 is clamped on the spindle 818 to machine the part 822. The spindle 818 may be rotated such that the cutting edge of the cutting tool 823 can remove material from the part 822. The machined part 822 is measured by a CMM machine (not shown) to a gauge for dimensional data.

The spindle 818, the A-table 812 and the C-table 844 are operatively connected to a controller 826 to provide input from the spindle 818, the A-table 812 and the C-table 844. The controller 826 also controls the CNC machine 810 including the rotational position of the A-table 812 and the C-table 844.

A fixture 820 is mounted to the A-table 812 and a part 822 is mounted on the fixture 820. The fixture 820 accommodates for different parts 822 to be mounted to the table 812. The fixture 820 is used to accommodate a variety of support locations on the parts 822 such that different parts 822 may be mounted to a common table 812. The A-table 812, the C-table 844 and the fixture 820 can be compensated to the CNC machine 810. The A-table 812 for the CNC machine 810 is configured to receive a fixture 820.

One part 822 is clamped on the fixture 820 and mounted to the machine table 812. The fixture 820 includes a plurality of locators that are used to support the part 822 on the fixture 820. In the embodiment shown, there is at least one primary locator 830, a secondary locator 832 and three tertiary locators 834. The part 822 defines locator holes 836, 838 that correspond to some of the plurality of locators 830-834. However, each fixture 820 is designed to receive multiple different parts 822. Therefore, the part 822 may only define locator holes 836, 838 corresponding to some of the plurality of locators 830-834 on the fixture 820. The primary locator 830 typically has a corresponding primary locator hole 836 and the secondary locator 832 typically has a secondary locator hole 838. Additional locator holes are not shown, but may correspond to any or all of the tertiary locators 834.

The actual part 822 position may not be located properly with respect to the fixture 820 and the tables 812 and 844 for a number of reasons including debris, distortion of the locators resulting from fixture wear, wear on the part locator holes resulting from repeated locating, distortion of the part 822 due to clamping pressure and cutting force, and drifting of the tables 812, 844 and/or the fixture 820. The actual part 822 position compared to the nominal part position, may include any linear deviations and rotational deviations resulting from the part 822 and/or fixture 820 being tilted relative to any of the planes of the coordinate system 816. Any misalignment of the part 822 may causes the parts 822 to be shifted or skewed relative to the CNC machine 810. Thus, the misalignment would result in the CNC machine 810 machining at the wrong locations on that part 822. Therefore, the coordinate system 816, the A-axis 824, and the C-axis 846 must be compensated to the part 822 before the CNC machine 810 can machine the part 822. The coordinate system 816 center is electronically compensated to the actual part center and orientation to properly locate the part 822 to the CNC machine 810.

To define the coordinate system 816, the A-axis 824 and the C-axis 846 nominal position information is input in the controller 826 including a nominal A-table center ($Tx_A$, $Ty_A$, $Tz_A$), a nominal C-table center ($Tx_C$, $Ty_C$, $Tz_C$), a nominal part center ($Px_0$, $Py_0$, $Pz_0$), a nominal A-table rotation (A), and a nominal C-table rotation (C). The CMM machine measures the deviation of the features of the actual part 822 machined on the CNC machine 810, and the deviations are converted to offset values through the use of software. The CNC machine 810 utilizes the nominal and offset information to compensate for to compensate the coordinate system 816, the A-axis 824 and the C-axis 846 with the actual part center.

Once the part 822 is clamped on the fixture 820 and the cutting tool 823 machines multiple features 840 (only one shown) and surfaces 842. The features 840 and surfaces 842 are measured by the CMM to determine the actual position of the part 822. Each of the features 840 and the surfaces 842 are machined at multiple rotational positions of the CNC machine 810 about the A-axis 824 and C-axis 846.

The coordinate system 816 travels with the part center as tables 812 and 844 rotate. For a five-axis A-on-C rotary table CNC machine 810 the table 812 rotary axis A aligns with the X-axis of the coordinate system 816 and the table 844 rotary axis C aligns with the Z-axis of the coordinate system when A and C are at zero degrees. Therefore, there is an A rotation offset and linear offsets for the Y-axis and the Z-axis for the first table 812, and there is a C rotational offset and linear offsets for the X-axis and the Y-axis for the second table. In addition, there is a combination A and C rotational offset for the tables 812 and 844.

For a five-axis A-on-C rotary table CNC machine 810 there are nine degrees of freedom of error which the part 822 may be offset from the nominal part center. The A-table 812 error may be compensated in the Y-direction by the table offset ($\Delta Ty_A$) and in the Z-direction by the table offset ($\Delta Tz_A$). The C-table 844 deviations error may be compensated in the X-direction by the table offset ($\Delta Tx_C$) and in the Y-direction by the table offset ($\Delta Ty_C$). The fixture error may be compensated in the X-direction by the fixture offset ($\Delta Px_0$), in the Y-direction by the fixture offset ($\Delta Py_0$), and in the Z-direction by the fixture offset ($\Delta Pz_0$). Finally, the rotational offsets include the rotational offset ($\Delta A$) about the A-axis 824 and the rotational offset ($\Delta C$) about the C-axis 846. Please note, all subscripts refer to the rotational orientation about the A-axis 824 and C-axis 846 at which each particular value refers to. Thus, a subscript 0 refers to the fixture offsets at zero-degrees of rotation A position and C position, a subscript A refers to the table offsets to the A-table 812, and a subscript C refers to the table offsets to the C-table 844.

Although there are nine degrees of freedom of error for the part 822, for a five-axis machine there are only five controllable axes on which the coordinate system 816 may be adjusted to compensate for the nine degrees of freedom of error. Using the nominal A-table center ($Tx_A$, $Ty_A$, $Tz_A$), the nominal C-table center ($Tx_C$, $Ty_C$, $Tz_C$), the nominal part center ($Px_0$, $Py_0$, $Pz_0$), the nominal A-table rotation (A), the nominal C-table rotation (C), and the corresponding offsets, the coordinated system 816 origin is translated to each of the five-axes. This is represented by the set of equations below which provide a global offset compensation for the CNC machine 810, where Wx is the X-axis position, Wy is the Y-axis position, Wz is the Z-axis position, Wa is the A-axis position and Wc is the C-axis position:

$$Wx = (Tx_C + \Delta Tx_C) + (Tx_A + Px_0 + \Delta Px_0)\cos C + [(Ty_A + \Delta Ty_A) + (Py_0 + \Delta Py_0)\cos A + (Pz_0 + \Delta Pz_0)\sin A]\sin C;$$

$$Wy = (Ty_C + \Delta Ty_C) - (Tx_A + Px_0 + \Delta Px_0)\sin C + [(Ty_A + \Delta Ty_A) + (Py_0 + \Delta Py_0)\cos A + (Pz_0 + \Delta Pz_0)\sin A]\cos C;$$

$$Wz = (Tz_C + Tz_A + \Delta Tz_A) - (Py_0 + \Delta Py_0)\sin A + (Pz_0 + \Delta Pz_0)\cos A;$$

$$W_A = A + \Delta A; \text{ and}$$

$$W_C = C + \Delta C.$$

The controller 826 translates the tables 312, 344 and the fixture 320 the offset amount for each of the five-axes to adjust the coordinate system 816, the A-axis 824 and the C-axis 846 and, therefore, compensate for the deviations. Once the nine offsets have been translated by the controller 826 then the coordinate system 816, the A-axis 824 and the C-axis 846 are compensated by that global offset, which compensates for all of the five controllable axes of the CNC machine 810. The part 822 may be machined by the CNC machine 810 once the global offset compensation has been applied. After the part 822 has been machined by the CNC machine 810 it may be measured by a CMM to check the accuracy.

Figure 10:
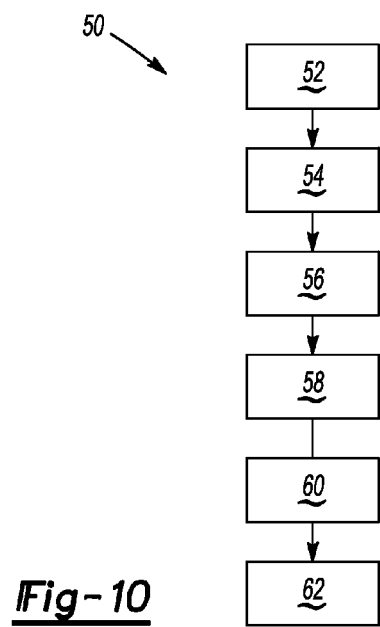
FIG. 10 is a schematic flow chart illustration of a first method of applying a global offset compensation to the CNC machines of FIGS. 1 and 4.

FIG. 10 illustrates a method of properly locating the part 22, 322 with the CNC machine 10, 310 of FIGS. 1 and 4 by determining a global offset compensation for the CNC machine 10, 310. Although only one four-axis CNC machine 10 and one five-axis CNC machine 310 are described herein locating the parts 122, 222, 422, 522, 622, 722, 822 by determining a global offset compensation for all four-axis CNC machines 110, 210 and five-axis CNC machines 410, 510, 610, 710, 810 may be completed in a similar manner. The global offset compensation includes a set of equations providing an offset amount for each of the controllable axes of the CNC machine 10, 310. The method for locating the part 22, 322 to the CNC machine 10, 310 is represented at 50 of FIG. 10.

The part 22, 322 is mounted on the table 12, 312, step 52. Mounting the part 22, 322 to the table 12, 312 may include clamping the part 22, 322 to the fixture 20, 320. The cutting tool 23, 323 machines the features 40, 340 and the surfaces 42, 342 on the parts 22, 322, step 54. A CMM machine (not shown) may measure the features on the parts 22, 322 to determine the actual part 22, 322 center position. A computer calculates the global offsets from the deviations measured by CMM, step 56. This includes calculating a table offset, a fixture offset, and a rotary offset of the actual part center position to a nominal part center position. For five axis CNC machines 310 there will be a first and second table offset and a first and second rotary offset.

The machine controller 26, 326 translates tables 12, 312, 344 and the fixture 20, 320 by the global offset for each of the controllable axes, step 58. For a four-axis machine there are four equations for the global offset compensation and for a five-axis machine there are five equations for the global offset compensation of the CNC machine 10, 310. However, for a four-axis CNC machine 10 there are six degrees of freedom of error and for a five-axis CNC machine 310 there are nine degrees of freedom of error for the part 22, 322. Therefore, translating the offset for each of the controllable axes for the CNC machine 10, 310 may include the controller 26, 326 translating the tables 12, 312, 344 and the fixture 20, 320 by the offset for each degree of freedom of the CNC machine 10, 310, based on the measured features 40, 340 and the surfaces 42, 342.

The controller adjusts the actual part center position, step 60. That is, the coordinate system 16, 316 is translated on each of the controllable axes for the CNC machine 10, 310 to compensate for the offset such that the coordinate system 16, 316 and the rotational axes for the CNC machine 10, 310 are compensated to the actual part center. Thereafter, any movements by the CNC machine 10, 310 compensate for the offset of the part 22, 322. If the offset for any of the degrees of freedom is greater than a predetermined limit, the table or the fixture must be manually re-aligned by a maintenance procedure to reduce the error prior to compensating the coordinate system 16, 316.

After the global offset compensation has been applied to the CNC machine 10, 310 to adjust the controllable axes to compensate the offset of the parts 22, 322 then the CNC machine 10, 310 can continue machining parts, step 62. After several parts have been machined using the CNC machine 10, 310 then the parts can be measured with the CMM to confirm they have been accurately machined (not shown).

While the best modes for carrying out the invention have been described in detail, those familiar with the art to which this invention relates will recognize various alternative designs and embodiments for practicing the invention within the scope of the appended claims.

The invention claimed is:

1. A method for locating a part on a CNC machine comprising:
    clamping a part to a fixture on a table for the CNC machine;
    machining a plurality of features and surfaces on the part;
    calculating a plurality of global offsets for the fixture and the table based on location data of the plurality of features and surfaces;
    determining an actual part position on a global coordinate system for the CNC machine by translating the fixture and the table by each of the plurality of global offsets relative to the coordinate system;
    compensating the actual part position relative to a nominal part position for each of the controllable axes of the CNC machine;
    programming a controller with a global offset compensation based upon the calculated offset for each controllable axis of the CNC machine to adjust each of the controllable axes relative to the actual part position;
    wherein determining the actual part position further includes translating the fixture and the table by each of the plurality of global offsets for every degree of freedom of the machine relative to one of the controllable axes, and wherein translating the fixture and the table by each of the plurality of global offsets further includes:
        translating the table in an X-direction and a Z-direction relative to the controllable axis of the X-direction and the Z-direction based upon the table offsets;
        translating the fixture in an X-direction, a Y-direction, and a Z-direction relative to the controllable axis of the X-direction, Y-direction, and Z-direction based upon the fixture offsets; and
        translating the table relative to the controllable axis of the B-direction based upon the table offsets for a four-axis B rotary table CNC machine.

2. The method of claim 1, wherein translating the fixture and the table by each of the plurality of global offsets occurs after the part has been clamped to the fixture.

3. A method for loading a part on a four-axis CNC machine having six degrees of freedom comprising:
    mounting a fixture on a table for the CNC machine;
    clamping a part to the fixture;
    machining a plurality of features and surfaces on the part and using the machined features and surfaces to determine an actual part center position;
    calculating a table offset, a fixture offset, and a rotary axis offset of the actual part center position to a nominal part center position;
    translating the table and the fixture by the table offset, the fixture offset, and the rotary axis offset in order to determine a position of the actual part center to the nominal part center for a coordinate system for each of the four axes of the CNC machine; and
    programming a controller with a global offset compensation based upon the calculated offset amount for each of the six degrees of freedom to translate the coordinate system on each of the four axes to the actual part center position.

4. The method of claim 3, wherein translating the table offset, the fixture offset, and the rotary axis offset further includes:
    translating the table in an X-direction and a Z-direction relative to the controllable axis of the X-direction and the Z-direction based upon the table offsets;
    translating the fixture in an X-direction, a Y-direction, and a Z-direction relative to the controllable axis of the X-direction, Y-direction, and Z-direction based upon the fixture offsets; and
    translating the table relative to the controllable axis of the B-direction based upon the table offsets for a four-axis B rotary table CNC machine.

5. The method of claim 3, wherein translating the table offset, the fixture offset, and the rotary axis offset further includes:
    translating the table in an X-direction and a Y-direction relative to the controllable axis of the X-direction and the Y-direction based upon the table offsets;
    translating the fixture in a X-direction, a Y-direction, and a Z-direction relative to the controllable axis of the X-direction, Y-direction and Z-direction based upon the fixture offsets; and
    translating the table relative to the controllable axis of the C-direction based upon the table offsets for a four-axis C rotary table CNC machine.

6. The method of claim 3, wherein translating the table offset, the fixture offset, and the rotary axis offset further includes:
- translating the table in a Y-direction and a Z-direction relative to the controllable axis of the Y-direction and the Z-direction based upon the table offsets;
- translating the fixture in an X-direction, a Y-direction, and a Z-direction relative to the controllable axis of the X-direction, Y-direction and Z-direction based upon the fixture offsets; and
- translating the table relative to the controllable axis of the A-direction based upon the table offsets for a four-axis A rotary table CNC machine.

7. A method for loading a part on a five-axis CNC machine having nine degrees of freedom comprising:
- mounting a fixture on a table for the CNC machine;
- clamping a part to the fixture;
- machining a plurality of features and surfaces on the part and using the machined features and surfaces to determine an actual part center position;
- calculating a first table offset, a second table offset, a fixture offset, a first rotary axis offset, and a second rotary axis offset of the actual part center position to a nominal part center position;
- translating the first table offset, the second table offset, the fixture offset, the first rotary axis offset, and the second rotary axis offset in order to determine a position of the actual part center to the nominal part center for a coordinate system for each of the five axes of the CNC machine; and
- programming a controller with a global offset compensation based upon the calculated offset amount for each of the nine degrees of freedom to translate the coordinate system on each of the five axes to the actual part center position.

8. The method of claim 7, wherein translating the first table offset, the second table offset, the fixture offset, the first rotary axis offset and the second rotary axis offset further includes:
- translating an A-table in a Y-direction and a Z-direction relative to the controllable axis of the Y-direction and the Z-direction based upon the A-table offsets;
- translating a B-table in an X-direction and a Z-direction relative to the controllable axis of the X-direction and the Z-direction based upon the B-table offsets;
- translating the fixture in a X-direction, a Y-direction, and a Z-direction relative to the controllable axis of the X-direction, Y-direction and Z-direction based upon the fixture offsets;
- translating the A-table relative to the controllable axis of the A-direction based upon the A-table offsets; and
- translating the B-table relative to the controllable axis of the B-direction based upon the B-table offsets for one of a five-axis A-on-B rotary table CNC machine and a five-axis B-on-A rotary table CNC machine.

9. The method of claim 7, wherein translating the first table offset, the second table offset, the fixture offset, the first rotary axis offset and the second rotary axis offset further includes:
- translating a B-table in an X-direction and a Z-direction relative to the controllable axis of the X-direction and the Z-direction based upon the B-table offsets;
- translating a C-table in an X-direction and a Y-direction relative to the controllable axis of the X-direction and the Y-direction based upon the C-table offsets;
- translating the fixture in a X-direction, a Y-direction, and a Z-direction relative to the controllable axis of the X-direction, Y-direction and Z-direction based upon the fixture offsets;
- translating the B-table relative to the controllable axis of the B-direction based upon the B-table offsets; and
- translating the C-table relative to the controllable axis of the C-direction based upon the C-table offsets for one of a five-axis C-on-B rotary table CNC machine and a five-axis B-on-C rotary table CNC machine.

10. The method of claim 7, wherein translating the first table offset, the second table offset, the fixture offset, the first rotary axis offset and the second rotary axis offset further includes:
- translating an A-table in a Y-direction and a Z-direction relative to the controllable axis of the Y-direction and the Z-direction based upon the A-table offsets;
- translating a C-table in an X-direction and a Y-direction relative to the controllable axis of the X-direction and the Y-direction based upon the C-table offsets;
- translating the fixture in a X-direction, a Y-direction, and a Z-direction relative to the controllable axis of the X-direction, Y-direction and Z-direction based upon the fixture offsets;
- translating the A-table relative to the controllable axis of the A-direction based upon the A-table offsets; and
- translating the C-table relative to the controllable axis of the C-direction based upon the C-table offsets for one of a five-axis A-on-C rotary table CNC machine and a five-axis C-on-A rotary table CNC machine.

11. A method for locating a part on a CNC machine comprising:
- clamping a part to a fixture on a table for the CNC machine;
- machining a plurality of features and surfaces on the part;
- calculating a plurality of global offsets for the fixture and the table based on location data of the plurality of features and surfaces;
- determining an actual part position on a global coordinate system for the CNC machine by translating the fixture and the table by each of the plurality of global offsets relative to the coordinate system;
- compensating the actual part position relative to a nominal part position for each of the controllable axes of the CNC machine;
- programming a controller with a global offset compensation based upon the calculated offset for each controllable axis of the CNC machine to adjust each of the controllable axes relative to the actual part position;
- wherein determining the actual part position further includes translating the fixture and the table by each of the plurality of global offsets for every degree of freedom of the machine relative to one of the controllable axes, and wherein translating the fixture and the table by each of the plurality of global offsets further includes:
  - translating the table in a Y-direction and a Z-direction relative to the controllable axis of the Y-direction and the Z-direction based upon the table offsets;
  - translating the fixture in an X-direction, a Y-direction, and a Z-direction relative to the controllable axis of the X-direction, Y-direction and Z-direction based upon the fixture offsets; and
  - translating the table relative to the controllable axis of the A-direction based upon the table offsets for a four-axis A rotary table CNC machine.

12. The method of claim 11, wherein translating the fixture and the table by each of the plurality of global offsets occurs after the part has been clamped to the fixture.

* * * * *